MULTILAYER CIRCUIT CONNECTION

Filed July 11, 1963 14 Sheets-Sheet 1

INVENTOR.
HANS F. SCHNITZLER
BY
[signature]
ATTORNEY

Sept. 20, 1966 H. F. SCHNITZLER 3,274,327

MULTILAYER CIRCUIT CONNECTION

Filed July 11, 1963 14 Sheets-Sheet 2

INVENTOR.
HANS F. SCHNITZLER
BY
Samuel Cohen
Attorney

INVENTOR.
HANS F. SCHNITZLER
BY
Attorney

Sept. 20, 1966 H. F. SCHNITZLER 3,274,327

MULTILAYER CIRCUIT CONNECTION

Filed July 11, 1963 14 Sheets-Sheet 4

INVENTOR.
HANS F. SCHNITZLER
BY
[signature]
Attorney

Sept. 20, 1966 H. F. SCHNITZLER 3,274,327

MULTILAYER CIRCUIT CONNECTION

Filed July 11, 1963 14 Sheets-Sheet 5

INVENTOR.
HANS F. SCHNITZLER

BY

Attorney

MULTILAYER CIRCUIT CONNECTION

Filed July 11, 1963 14 Sheets-Sheet 6

INVENTOR.
HANS F. SCHNITZLER
BY
[signature]
Attorney

Sept. 20, 1966 H. F. SCHNITZLER 3,274,327

MULTILAYER CIRCUIT CONNECTION

Filed July 11, 1963 14 Sheets-Sheet 7

INVENTOR.
HANS F. SCHNITZLER
BY
Samuel Cohen
Attorney

MULTILAYER CIRCUIT CONNECTION

Filed July 11, 1963 14 Sheets-Sheet 8

INVENTOR.
HANS F. SCHNITZLER
BY
Attorney

HANS F. SCHNITZLER
INVENTOR.
BY
Attorney

LEGEND:
= CONDUCTOR
= RESISTOR
✱ = DELETED CONNECTION

INVENTOR.
HANS F. SCHNITZLER
BY
Samuel Cohen
Attorney

Sept. 20, 1966 H. F. SCHNITZLER 3,274,327

MULTILAYER CIRCUIT CONNECTION

Filed July 11, 1963 14 Sheets-Sheet 11

INVENTOR.
HANS F. SCHNITZLER
BY
Samuel Cole
Attorney

MULTILAYER CIRCUIT CONNECTION

Filed July 11, 1963 14 Sheets-Sheet 12

INVENTOR
HANS F. SCHNITZLER
BY [signature]
Attorney

Sept. 20, 1966 H. F. SCHNITZLER 3,274,327

MULTILAYER CIRCUIT CONNECTION

Filed July 11, 1963 14 Sheets-Sheet 13

INVENTOR.
HANS F. SCHNITZLER
BY
[signature]
Attorney

INVENTOR.
HANS F. SCHNITZLER
BY
[signature]
Attorney

United States Patent Office 3,274,327 Patented Sept. 20, 1966

3,274,327

MULTILAYER CIRCUIT CONNECTION

Hans F. Schnitzler, Levittown, N.J., assignor to Radio Corporation of America, a corporation of Delaware Filed July 11, 1963, Ser. No. 294,302
8 Claims. (Cl. 174—68.5)

This invention relates generally to the problem of interconnecting electrical circuits and, more particularly, to the problem of interconnecting memory circuits printed on insulator substrates (printed on "cards").

According to one aspect of the invention, circuit cards, each with a printed circuit on one surface thereof, are arranged in a stack. Each card is formed with a group of first holes in corresponding positions on the cards through which conductors pass which connect to the circuits on all cards. Each card is also formed with a group of second holes in corresponding positions on the cards through which second conductors pass, but each second conductor connects to a circuit on a different card. The number *n* of cards which can be stacked is therefore normally limited by the number of second holes in a card.

In the present arrangement, spacer cards, which are preferably larger in size than the circuit cards, are located in the stack of each group of up to *n* circuit cards. The spacer cards are formed with holes in positions corresponding to the first holes in the circuit cards to permit the first conductors to pass. However, the spacer cards are imperforate in the areas of the spacer cards aligned with the second holes in the circuit cards. Instead, printed conductors appear in these areas which engage the second conductors and which extend to portions of the spacer cards which preferably stick out of the pack so as to provide convenient access to the second conductors.

Another aspect of the invention is the manner of connection of the circuits on the respective cards. The circuits have terminals printed on one surface thereof which surround the respective apertures to which the first and second conductors make contact. These holes and terminals may be in identical positions on the respective cards. Successive cards are staggered with respect to one another to cause the apertures in adjacent cards to overlap and to thereby provide greater surface area on each terminal to which positive electrical connection may be made. Then, fluid conductors, preferably in the form of molten metal, is caused to fill the apertures.

The invention is discussed in greater detail below and is shown in the following drawings of which:

Figure 8:
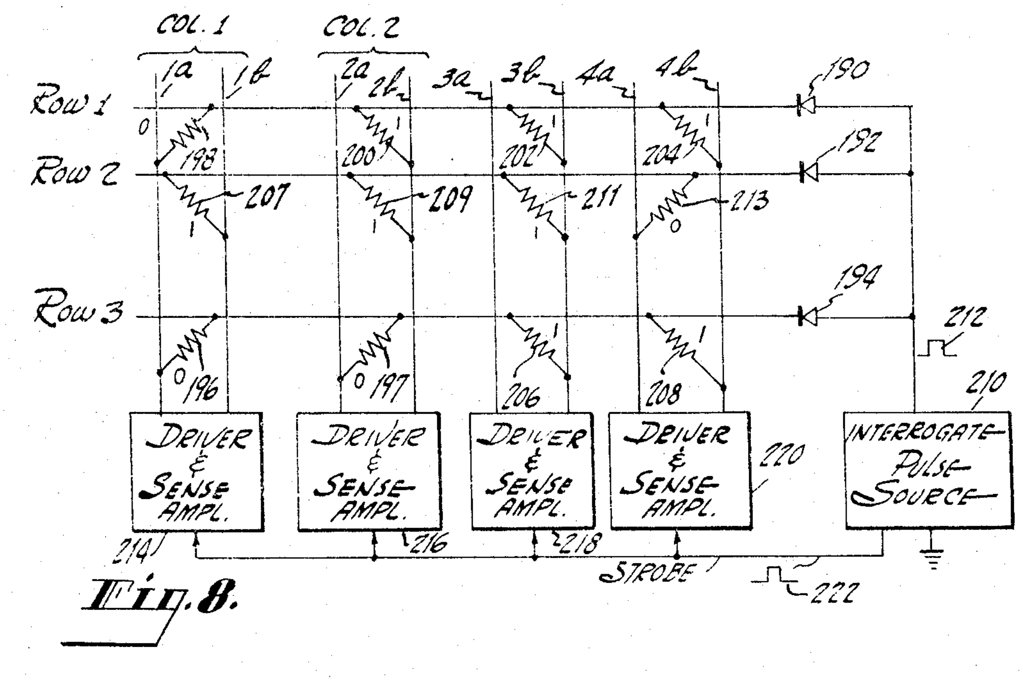
FIG. 8 is a block and schematic circuit diagram of a content addressed memory employing resistor storage elements and positive resistance diodes (conventional rectifier diodes) at the end of each row.
Figure 10:
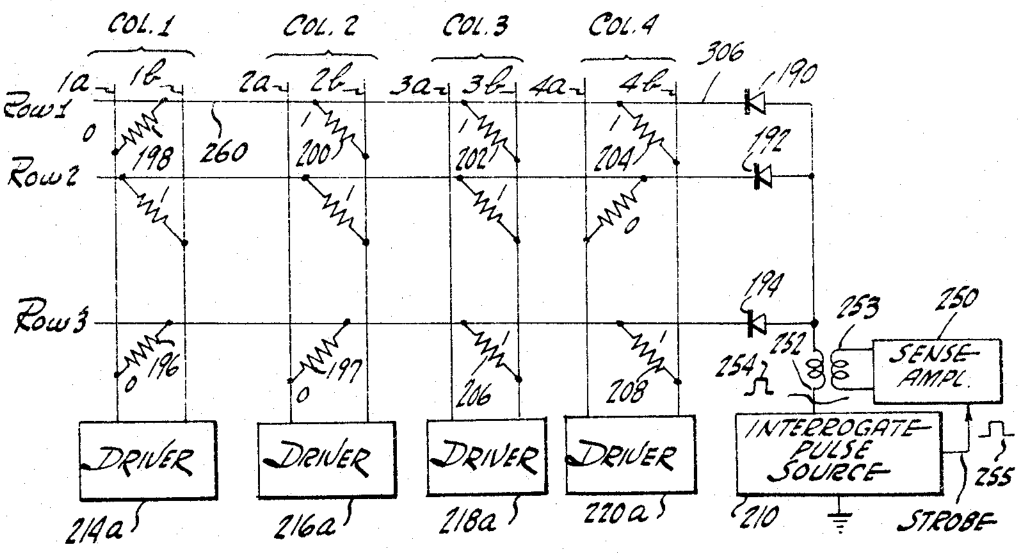
Figure 9A:
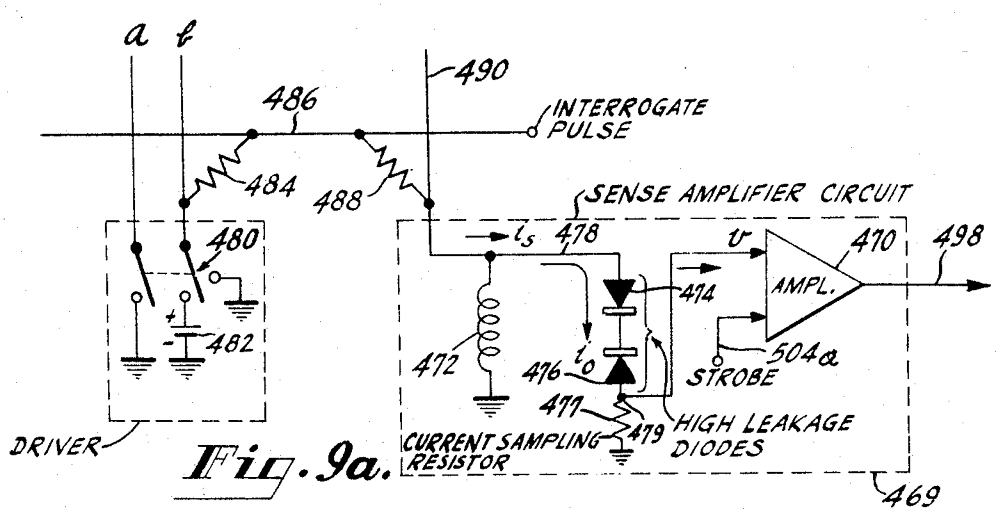
Figure 9B:
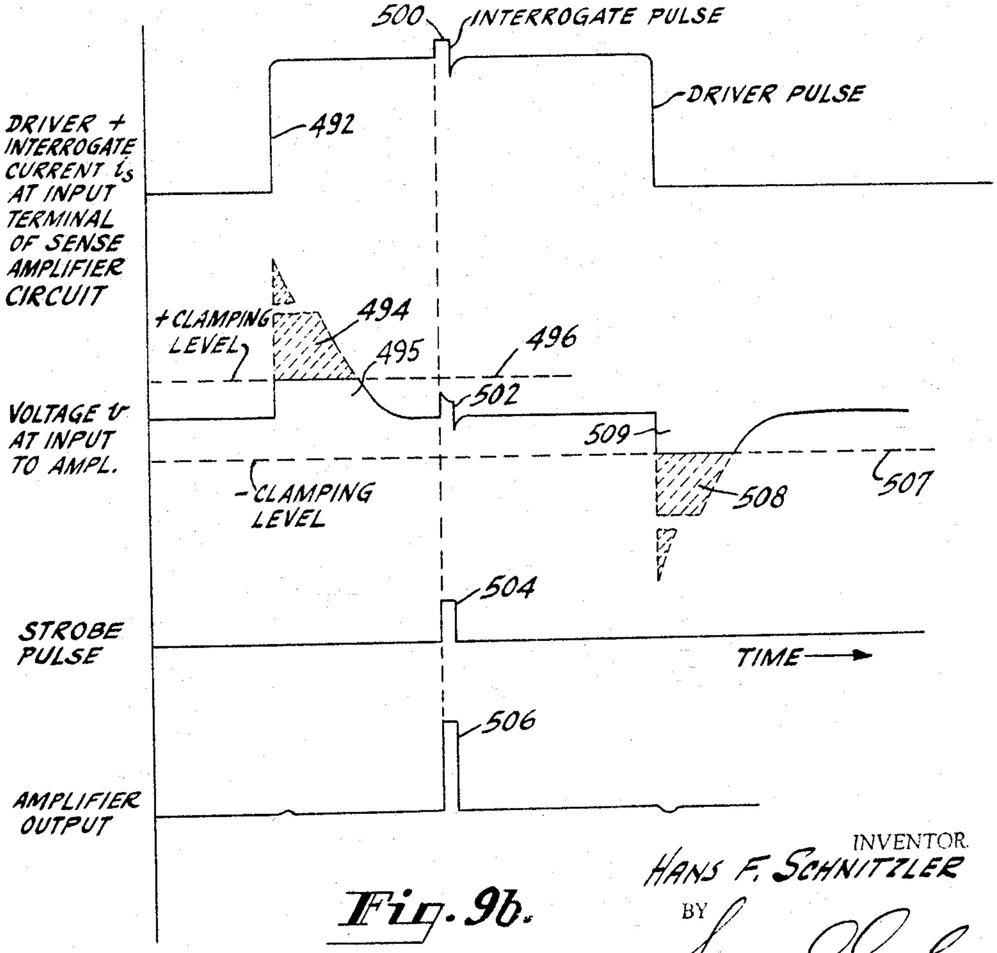
Figure 11:
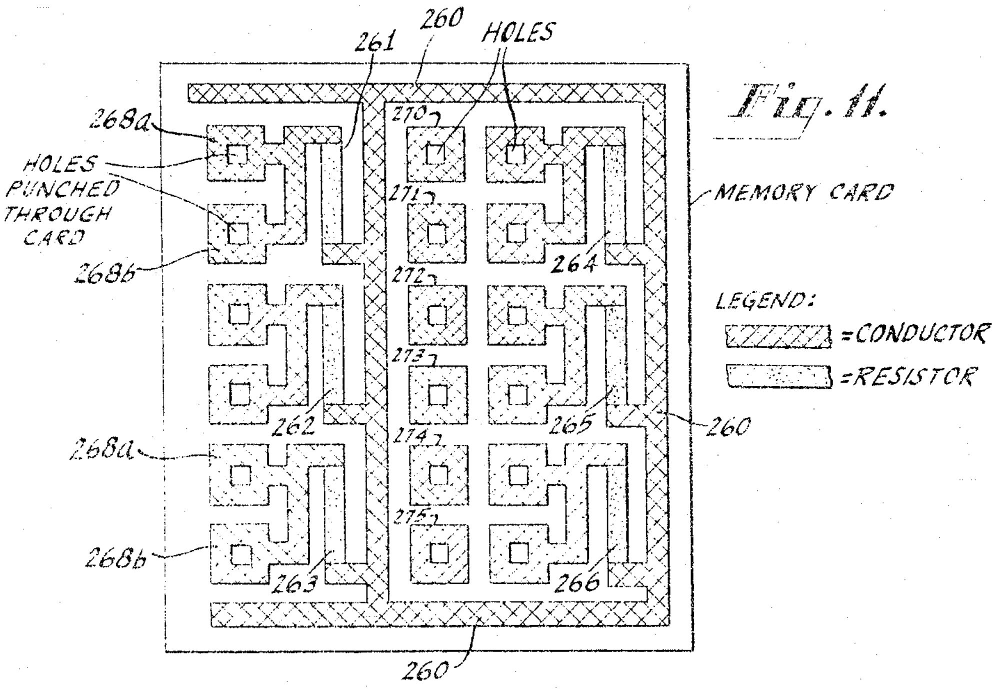
Figure 12:
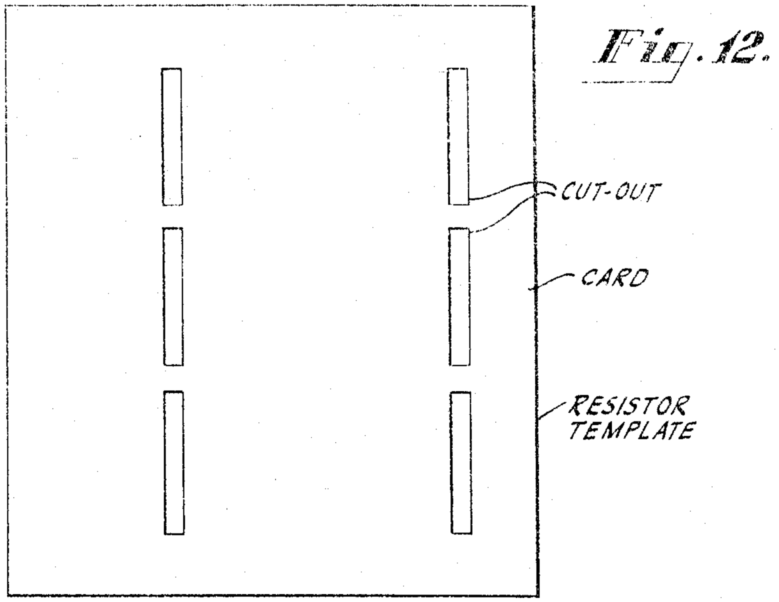
Figure 13:
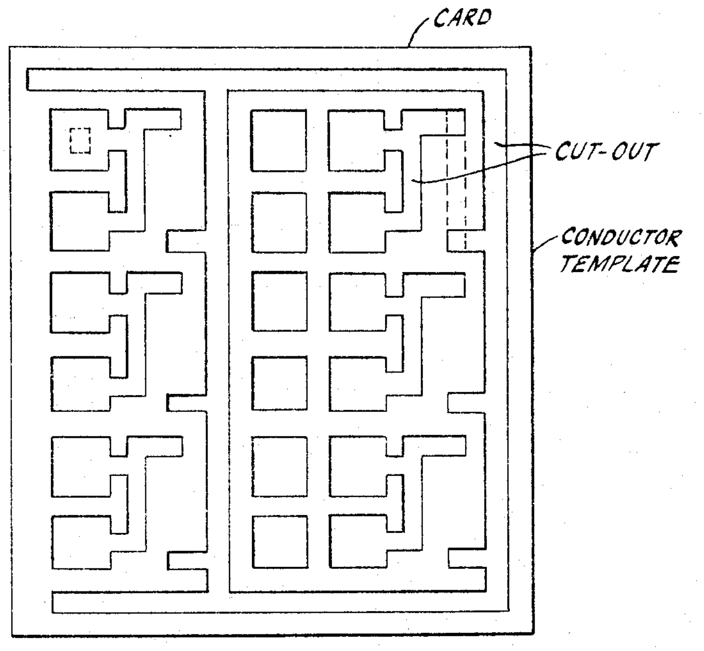
Figure 14:
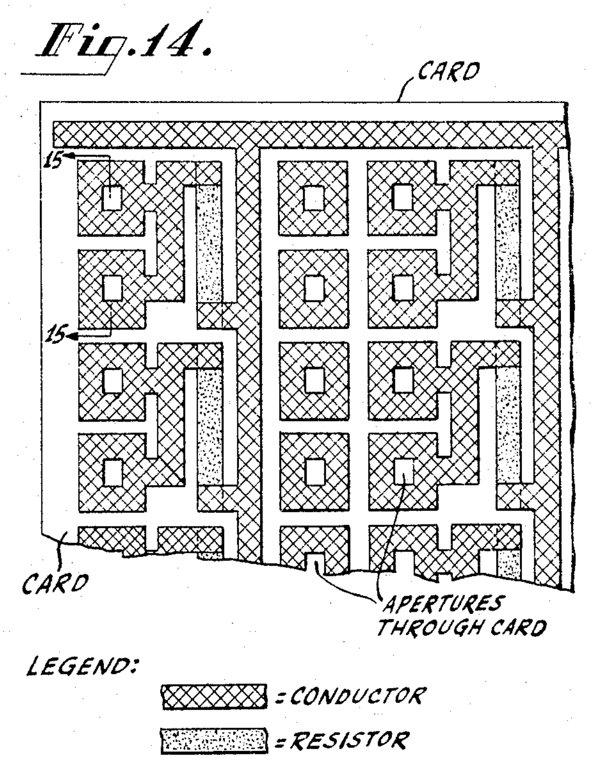
Figure 15:
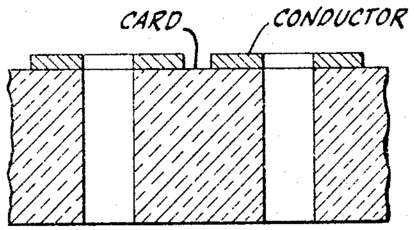
Figure 16:
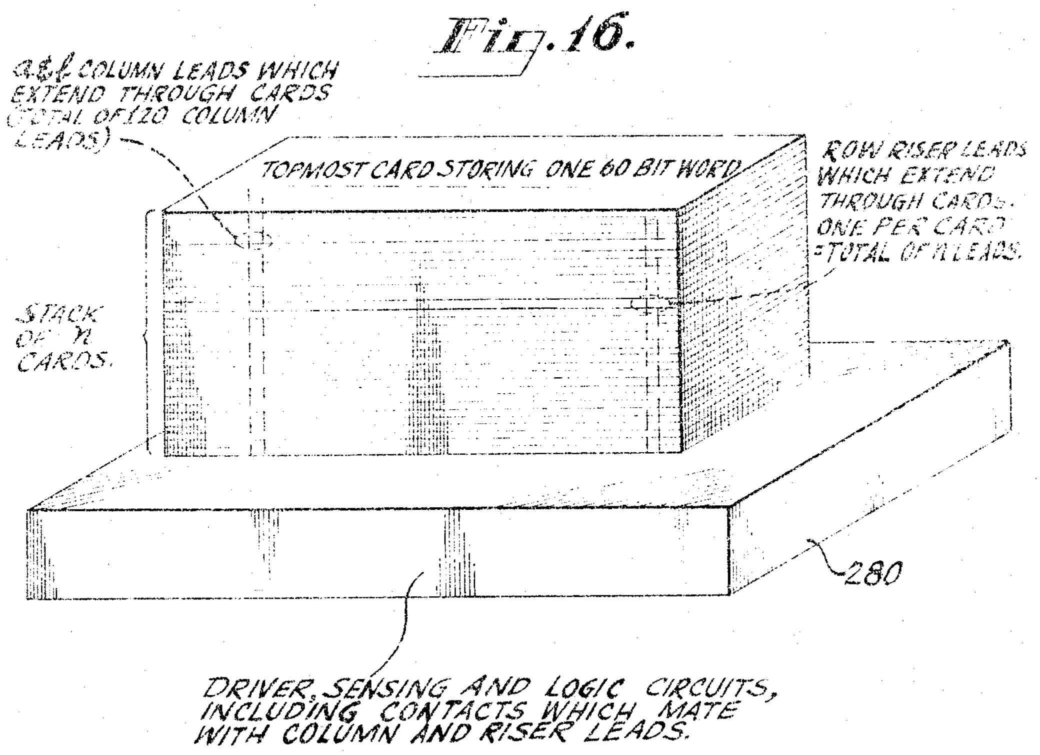
Figure 17:
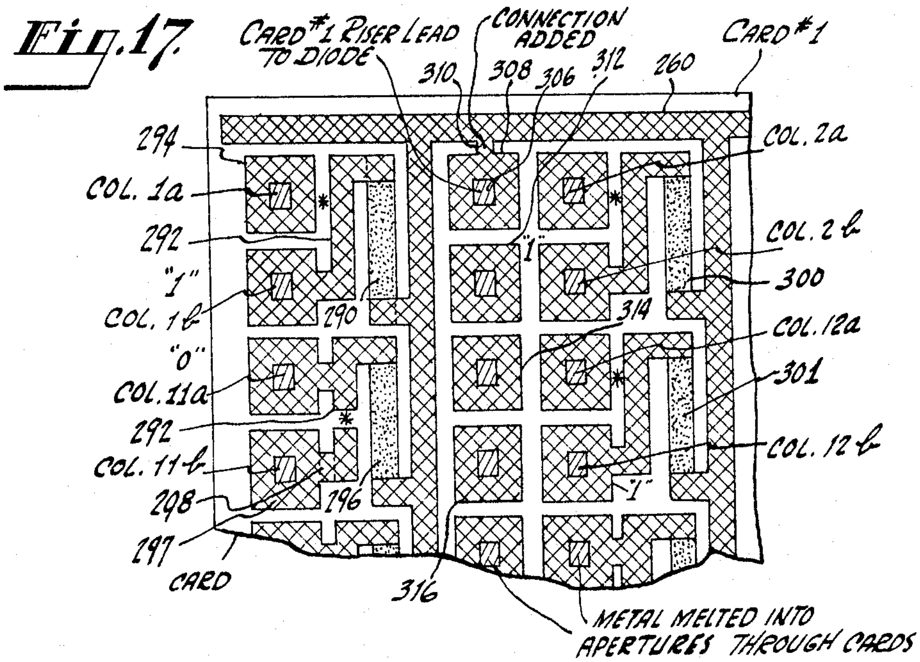
Figure 18:
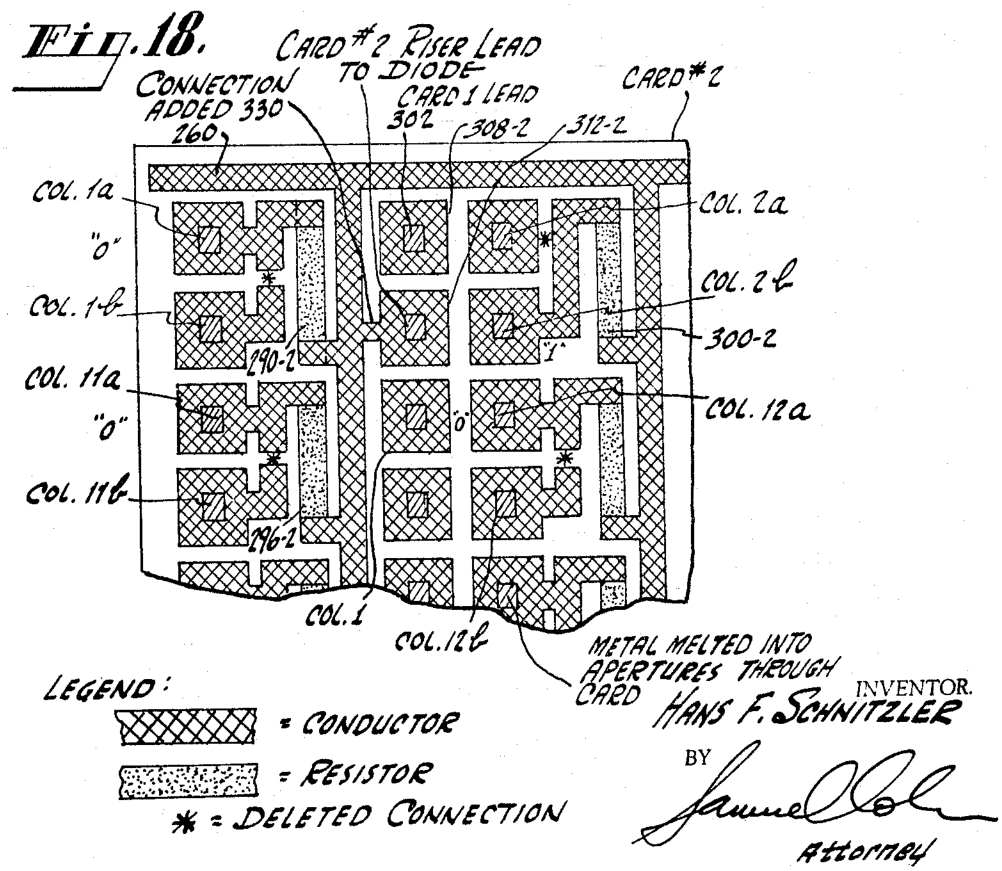
Figure 19:
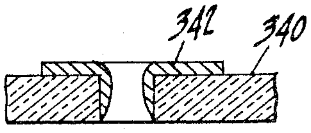
Figures 20, 21A, 22:
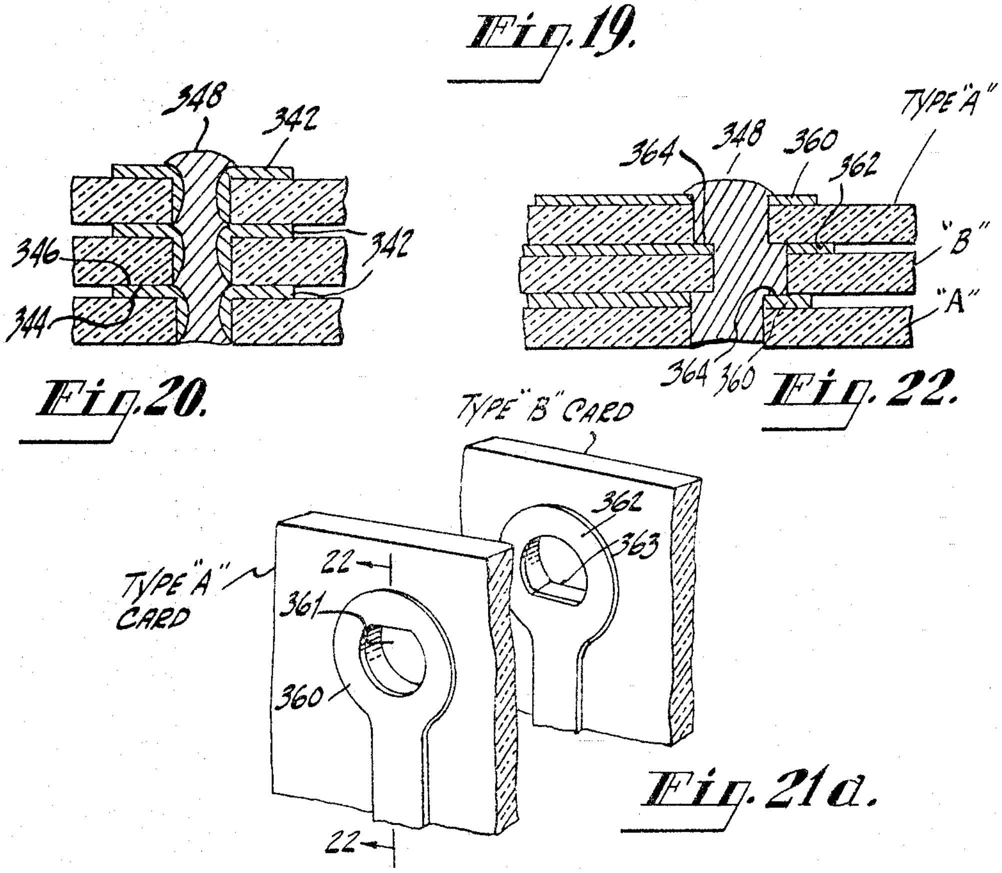
Figure 23:
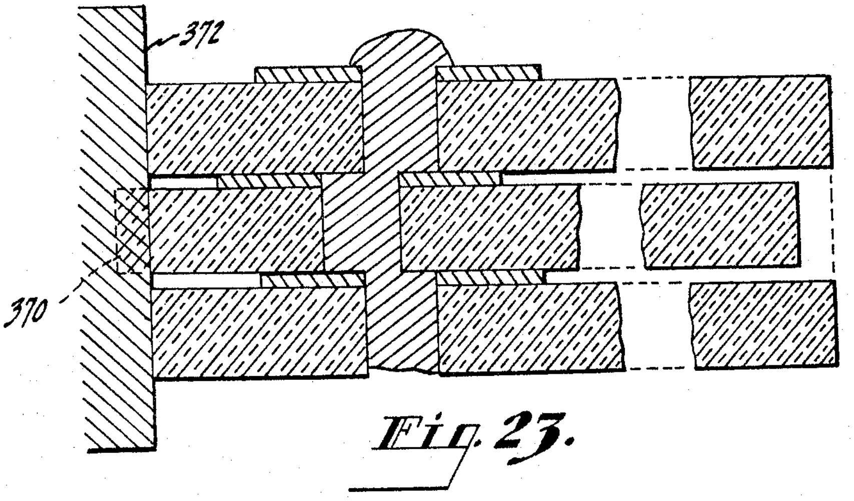
Figure 25:
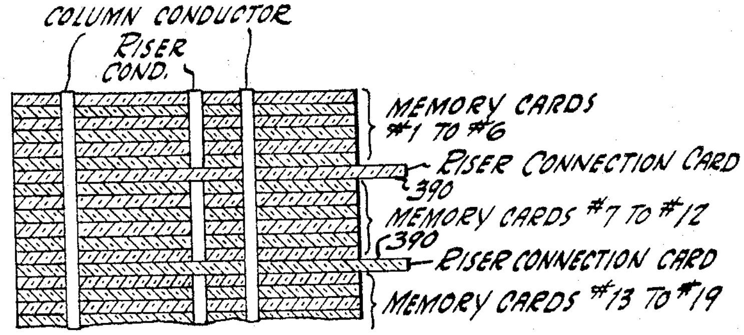
Figure 26:
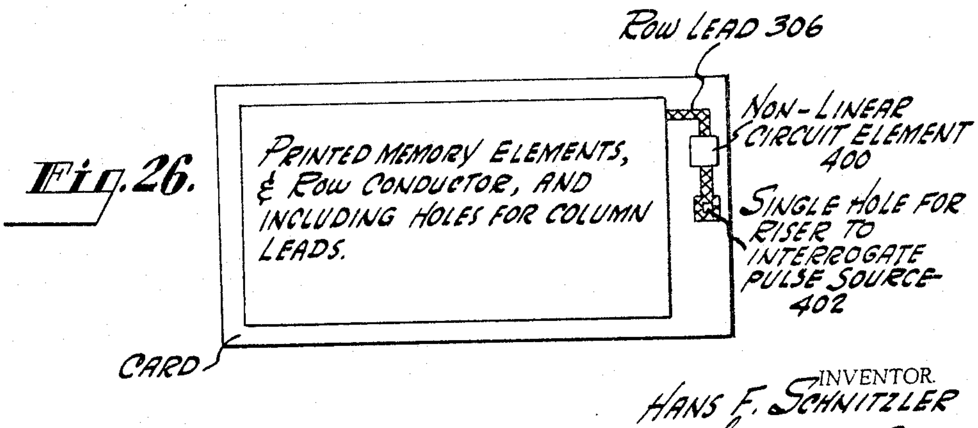

FIG. 9*a* is a block and schematic circuit diagram giving details of the sense amplifier circuits of FIG. 8;

FIG. 9*b* is a drawing of waveforms to help explain the operation of the circuit of FIG. 9*a*;

FIG. 10 is a block and schematic circuit diagram of another content addressed memory which employs resistor information storage elements and positive resistance diodes at the ends of each row;

FIG. 11 is a plan view showing the physical construction of a memory card;

FIGS. 12 and 13 are drawings of templets used in making the memory card of FIG. 11;

FIG. 14 is an enlarged view of a portion of a card memory, no information having been written on the card;

FIG. 15 is a cross-section taken along line 15—15 of FIG. 14;

FIG. 16 is a perspective sketch of a stack of cards making up a memory;

FIGS. 17 and 18 are plan views of two different cards which cards have information stored therein;

FIG. 19 is an enlarged cross-sectional view of a terminal on a memory card;

FIG. 20 is an enlarged cross-sectional view of several memory cards stacked one over another showing how contact is made to the terminals on the different cards;

FIGS. 21*a* and *b* are perspective views of portions of memory cards showing details of other terminal configurations;

FIG. 22 is a cross-section through a plurality of cards, like those of FIG. 21*a*, showing terminals staggered with respect to one another and showing also the way in which connections are made to the staggered terminals. This cross-section is taken along 22—22 of FIG. 21*a*, but with the cards stacked in a pack;

FIG. 23 is another cross-sectional view through a pack of memory cards showing a staggered terminal arrangement;

FIGS. 24*a*–24*d* are plan views of a number of memory cards and of a riser connection card;

FIG. 25 is a cross-sectional view taken through a stack of memory and riser connection cards, one riser card appearing after every six memory cards; and FIG. 26 is a schematic view of another form of memory card.

Figures 1, 2:
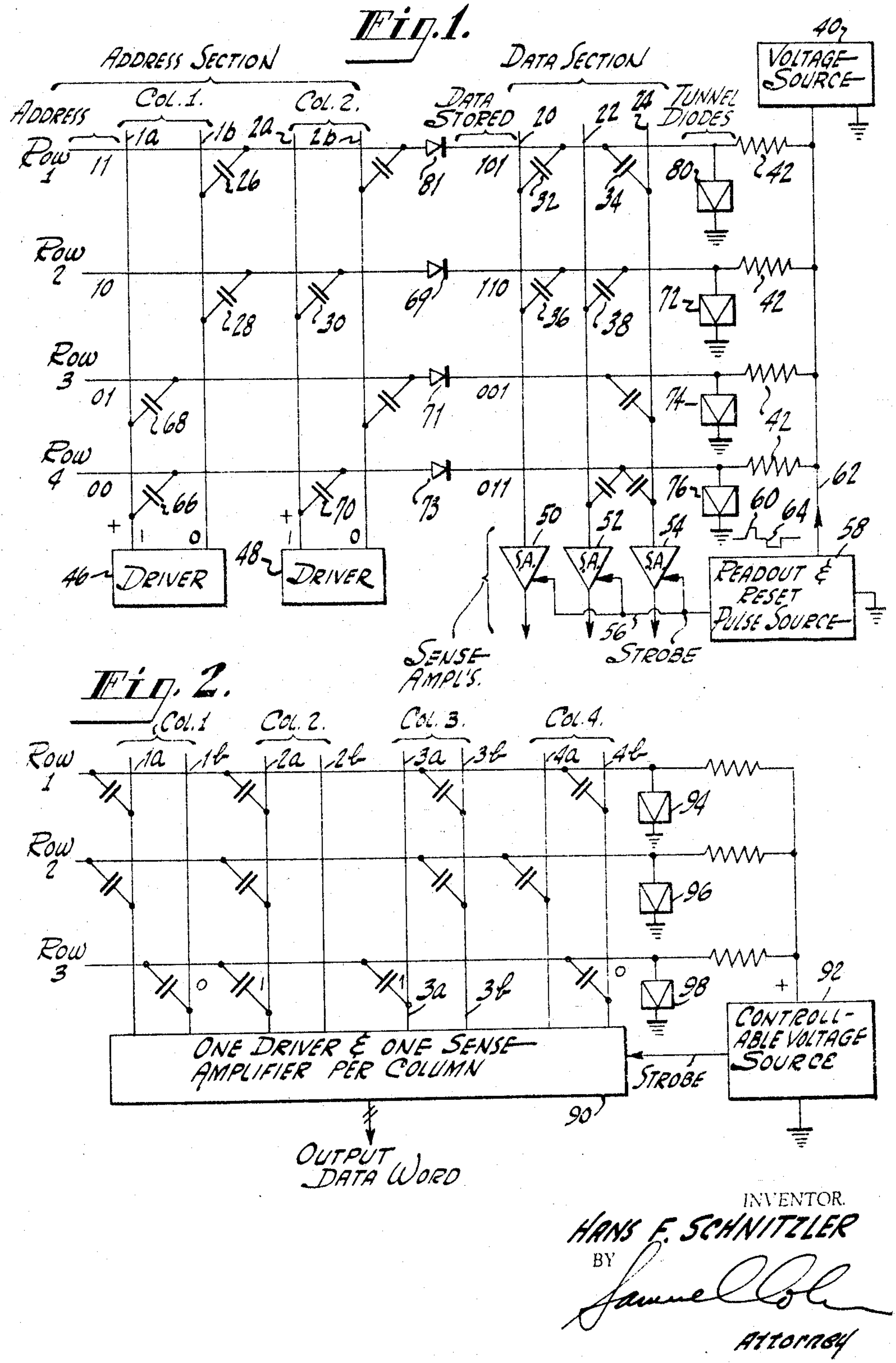
FIG. 1 is a block and schematic diagram of a content addressed memory employing a bistable element at the end of each row.
FIG. 2 is a block and schematic diagram of a second form of content addressed memory using bistable elements at the end of each row.

The memory shown in FIG. 1 includes row conductors and column conductors. There are two sections to the memory, namely an address section and a data section. The address section is shown to include two columns, legended Col. 1 and Col. 2, respectively, and each of these columns include two conductors. The data section of the memory is shown to include three columns 20, 22 and 24, each of these columns includes only one conductor.

For the purpose of simplifying the explanation, the memory of FIG. 1 and the memories of other figures are illustrated to have a relatively few number of storage locations. In practice, the memories discussed may be much larger and may, for example, include well upwards of 50 columns and 100 rows and corresponding numbers of storage locations.

The memory elements themselves are shown in FIG. 1 as capacitors such as 26 and 28 and so on. In the address section, there is a capacitor connected between only one of the conductors of each column and each row. For example, there is a capacitor 26 connected between column conductor 1*b* and row 1 (the row conductor for row 1), but no capacitor connected between column conductor 1*a* and row 1. In a similar manner, there is capacitor 30 connected between column conductor 2*a* and row 2, but no capacitor connected between column conductor 2*b* and row 2. In the data section the presence of a capacitor at a particular row-column intersection represents the binary digit "1" and its absence represents the binary digit "0." For example, the capacitors 32 and 34 connected to row 1 represent the storage of the word 1 0 1 in row 1. Similarly, the capacitors 36 and 38 connected to row 2 represent the storage of the word 1 1 0. In each case, the "zero" is indicated by the absence of the capacitor.

There are a plurality of two-state devices, shown in FIG. 1 as tunnel diodes, one connected to each row. The voltage source 40 and resistors 42 have a value such that they represent a substantially constant current source. The tunnel diodes are normally biased to their low voltage state.

Drivers 46 and 48 are connected to the conductors of columns 1 and 2, respectively. The columns 20, 22 and 24 of the data section lead to sense amplifiers 50, 52 and 54, respectively. These sense amplifiers are normally in an inoperative condition, but are enabled when a strobe pulse is applied to the amplifiers via lead 56. The strobe pulse is produced by the read-out and reset pulse source 58. The strobe pulse is concurrent with the positive pulse 60 which is applied to lead 62. The source 58 also produces a reset pulse 64 which follows the pulse 60.

In operation, the drivers 46 and 48 first apply a two bit address word to the memory. The address word may, for example, be 1 1 . A 1 corresponds to a positive voltage pulse applied to the *a* column conductor and a 0 corresponds to a positive voltage pulse applied to the *b* column conductor. The remaining column conductor, in each case, may be grounded. Therefore, the address word 1 1 corresponds to a positive voltage pulse applied to column 1*a* and a positive voltage pulse applied to column 2*a*, and columns 1*b* and 2*b* are grounded. The positive voltages are coupled through capacitors 66, 68, 70 and 30 to rows 2, 3 and 4 conductors. These voltages are in the forward direction with respect to diodes 69, 71 and 73 are therefore applied through the diodes to the tunnel diodes 72, 74 and 76. The drive voltage amplitude and the size of the capacitors are so chosen that the amount of signal coupled to a row through a single capacitor is sufficient to switch the tunnel diode connected to that row to the high state. Thus, tunnel diodes 72, 74 and 76 are switched to the high state. However, since there is no capacitor coupling from either columns 1*a* or 2*a* to row 1, row 1 does not receive a driving signal and tunnel diode 80 remains in the low state.

In order to read-out a word in the memory, the read-out and reset pulse source 58 applies a positive pulse 60 to lead 62. The positive pulse is of sufficient amplitude to switch any of the tunnel diodes remaining in the low state to the high state. Tunnel diode 80 is in the low state and it switches and produces a substantial output signal which is applied to row 1. This output signal is coupled through capacitors 32 and 34 to the column conductors 20 and 24. Diode 81, which is located between the data and address section, is reverse biased by this output signal and prevents any loss of this signal to the drivers. During the interval of pulse 60, the strobe pulse on lead 56 enables the sense amplifiers 50, 52 and 54. Therefore, these sense amplifirs read-out the signals available on columns 20, 22 and 24, namely, the word 1 0 1 which is stored in row 1.

The pulse 60 is applied also to tunnel diodes 72, 74 and 76. However, these tunnel diodes are already in the high state. Therefore, the voltage change ($dv/dt$) across these tunnel diodes due to the pulse 60 is relatively small and is insufficient to produce any significant feed through from rows 2, 3 and 4 to the data section columns.

After the read-out has been completed, the reset pulse source 58 applies a negative pulse 64 to all of the tunnel diodes. This pulse is of sufficient amplitude to reset all tunnel diodes to the low state. During the reset interval, the sense amplifiers 50, 52 and 54 are cut-off. Also, if desired, the drivers may be (electrically) disconnected from the column conductors to prevent loss of the reset signal through the coupling diodes 81, 69, 71 and 73. After reset, the memory is ready for another cycle of operation.

The memory of FIG. 2 is completely content addressable, that is, a tag word or bit can be applied to any one or more of the columns and any one or more complete rows in the memory can be read out. The block 90 represents a driver connected to each column and a sense amplifier connected to each column. The block 92 includes circuits which perform the function of both blocks 58 and 40 of FIG. 1.

The operation of the memory of FIG. 2 is quite analogous to that of FIG. 1. However, in the memory of FIG. 2 it is possible to interrogate any one or more columns of the memory and it is possible to read-out any one or more columns of the memory. Note that every column of the memory now includes a pair of conductors. At every row-column intersection the column lead to which the capacitor is connected determines the bit stored, as discussed earlier. For example, column 3 can be selected to be the address section of the memory. Here, if a "one" is applied to column 3*b*, tunnel diodes 94 and 96 are switched to the high state. Tunnel diode 98 remains in the low state. Now, if desired, during the interrogation interval (the interval in which tunnel diode 98 is switched to the high state by the source 92), the sense amplifiers connected to columns 1, 2, 3 and 4 can be strobed. This permits the word 0 1 1 0 (the word stored in row 3) to be read out of the memory.

While in the example above, only one column of the memory is used as an address column, it is to be understood that 2, 3 or 4 columns of the memory may constitute the address. In a similar manner, any number from one to four of the columns may be sensed to determine the data stored or the part of the data stored in a row of the memory. The same principles also apply to the memories discussed below.

In the example given of the operation of the memory of FIG. 2 and of a number of the following figures, only one word is read out of the memory at a time. It is also possible to read-out more than one word in the memory which correspond to a tag word. An interrogation routine which is applicable to these various memories is discussed in some detail in application Serial No. 183,187, Memory, filed March 28, 1962 by Morton H. Lewin and assigned to the same assignee as the present invention. A second interrogation routine is discussed later The memories of both FIGS. 1 and 2 employ bistable storage elements such as tunnel diodes for each row in the memory. A reset voltage pulse source and coupling circuits between the source and the respective tunnel diodes is also used. The memories described below are substantially simpler than those shown in FIGS. 1 and 2. In certain of the memories, temporary storage devices are employed for each line. For example, in the memory of FIG. 3, monostably biased tunnel diodes are used. This substantially simplifies the circuit as it obviates the reset pulse source and the circuits associated with it. In other of the memories described below, the only charge storage required is that available in the elements which represent the binary bits. For example, in the memory of FIG. 6, the capacitor elements themselves "remember" whether or not the row to which they are connected is storing a word which corresponds to the tag word. Finally, in some embodiments of the present invention, no charge storage at all is required. A memory of this type is shown in FIG. 8.

Figure 3:
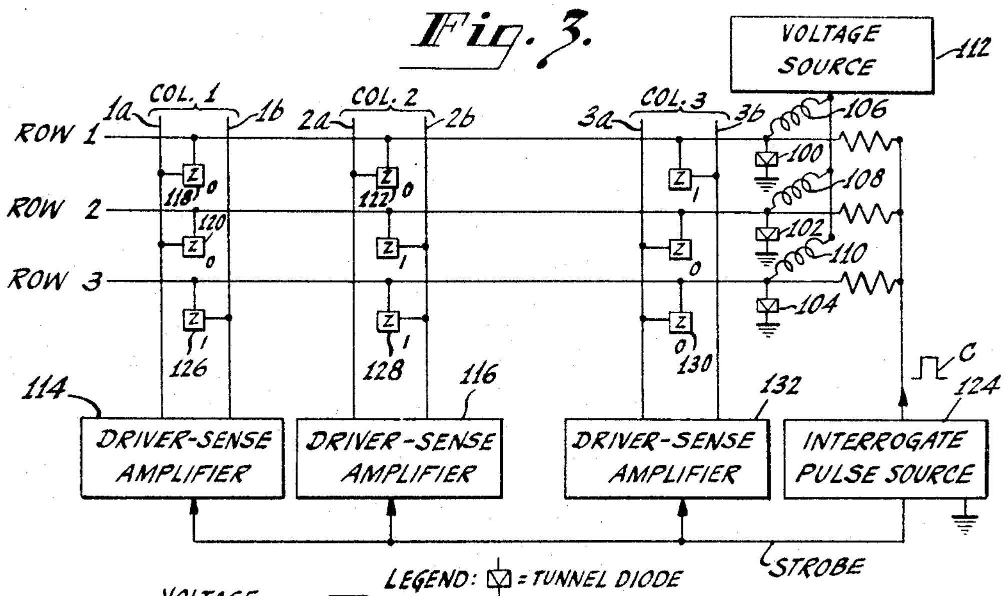
FIG. 3 is a block and schematic diagram of a content addressed memory employing monostable sensing elements at the end of each row.

FIG. 3 should now be referred to. The memory illustrated is similar to the one of FIG. 2 except that the tunnel diodes 100, 102 and 104 connected to the respective rows are monostably biased. Each tunnel diode is connected through an inductor, 106, 108 and 110, respectively, to a direct voltage source 112.

Figure 4:
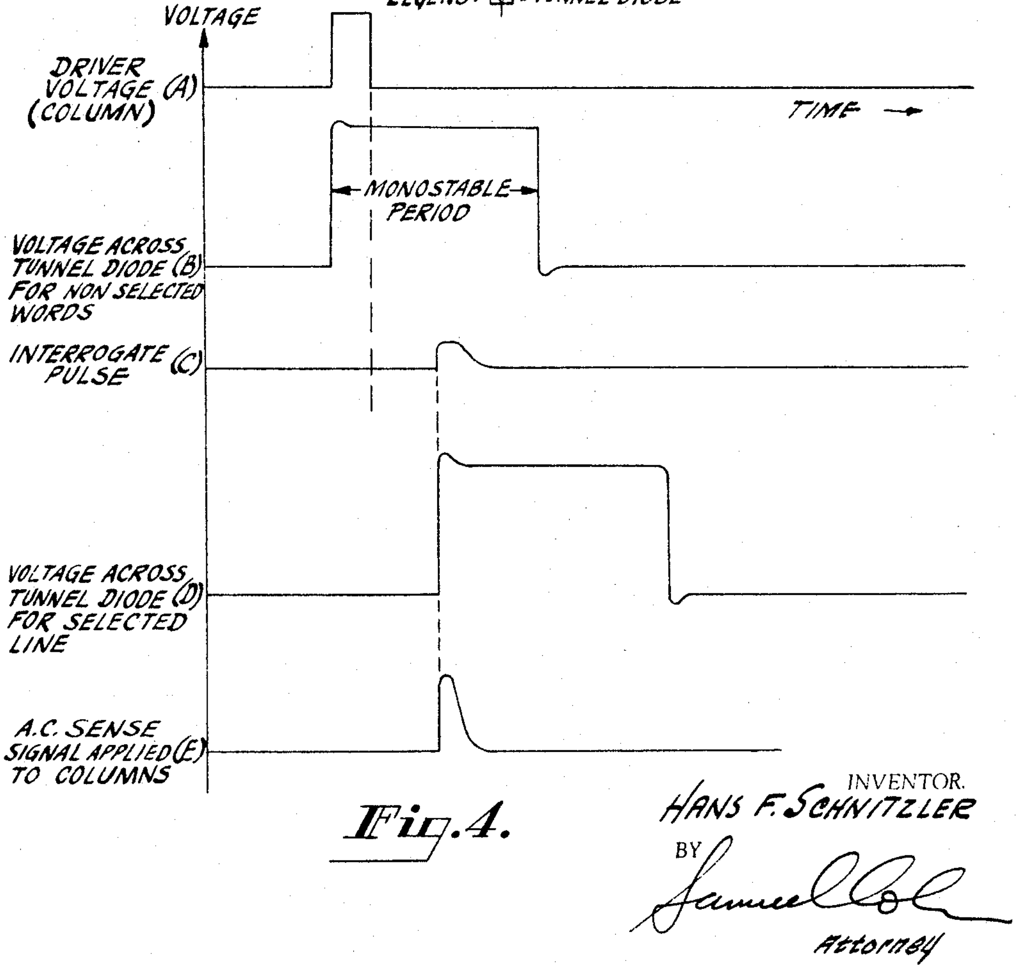
FIG. 4 is a drawing of waveforms to help explain the operation of the circuit of FIG. 3.

In the discussion of the operation of the memory of FIG. 3, the waveforms shown in FIG. 4 should be referred to. Assume that the tag word consists of 2 bits applied by the drivers of blocks 114 and 116, respectively and assume also that these bits are 1, 1. In other words, a positive voltage is applied to columns 1*a* and 2*a* and columns 1*b* and 2*b* are grounded. The positive voltage pulse is shown in waveform A of FIG. 4. This pulse is coupled through the impedance elements 118, 120 and 122 to the row 1 and row 2 leads to the tunnel diodes 100 and 102. The impedance elements represented by the Z appearing in each block may be linear elements such as capacitors, inductors, resistors, or the like. The positive voltage coupled to the tunnel diodes 100 and 102 switches them from their quiescent condition in the low state (low voltage state) to their quasistable condition in the high state (high voltage state), as indicated by waveform B of FIG. 4. The amount of time the tunnel diodes 100 and 102 remain in the high state depends on the circuit time constant which is largely a function of the value of the inductors 106 and 108.

As indicated by waveform C of FIG. 4, during the time the tunnel diodes 100 and 102 are in the high state, the interrogate, that is, read-out, pulse source 124 applies a positive pulse to all of the tunnel diodes 100, 102 and 104. As tunnel diodes 100 and 102 are already in the high state, the change in voltage across these tunnel diodes is relatively low. However, tunnel diode 104, which is still in the low state, now switches to the high state, as indicated by waveform D of FIG. 4. The switching of the tunnel diode results in a positive pulse being coupled through the storage elements 126, 128 and 130 to the sense amplifiers of blocks 114, 116 and 132. These sense amplifiers are normally in the "off" state, but are strobed during the interval of interrogation pulse C so that they are in condition to amplify the signals E (FIG. 4) appearing in the various columns.

A short time after the sense signals E occur, the tunnel diodes 100 and 102 return to their original state—the low state—and a short time after this, the tunnel diode 104 also switches back to its low state. Thereafter, the next cycle of memory operation can occur.

Figures 5, 6:
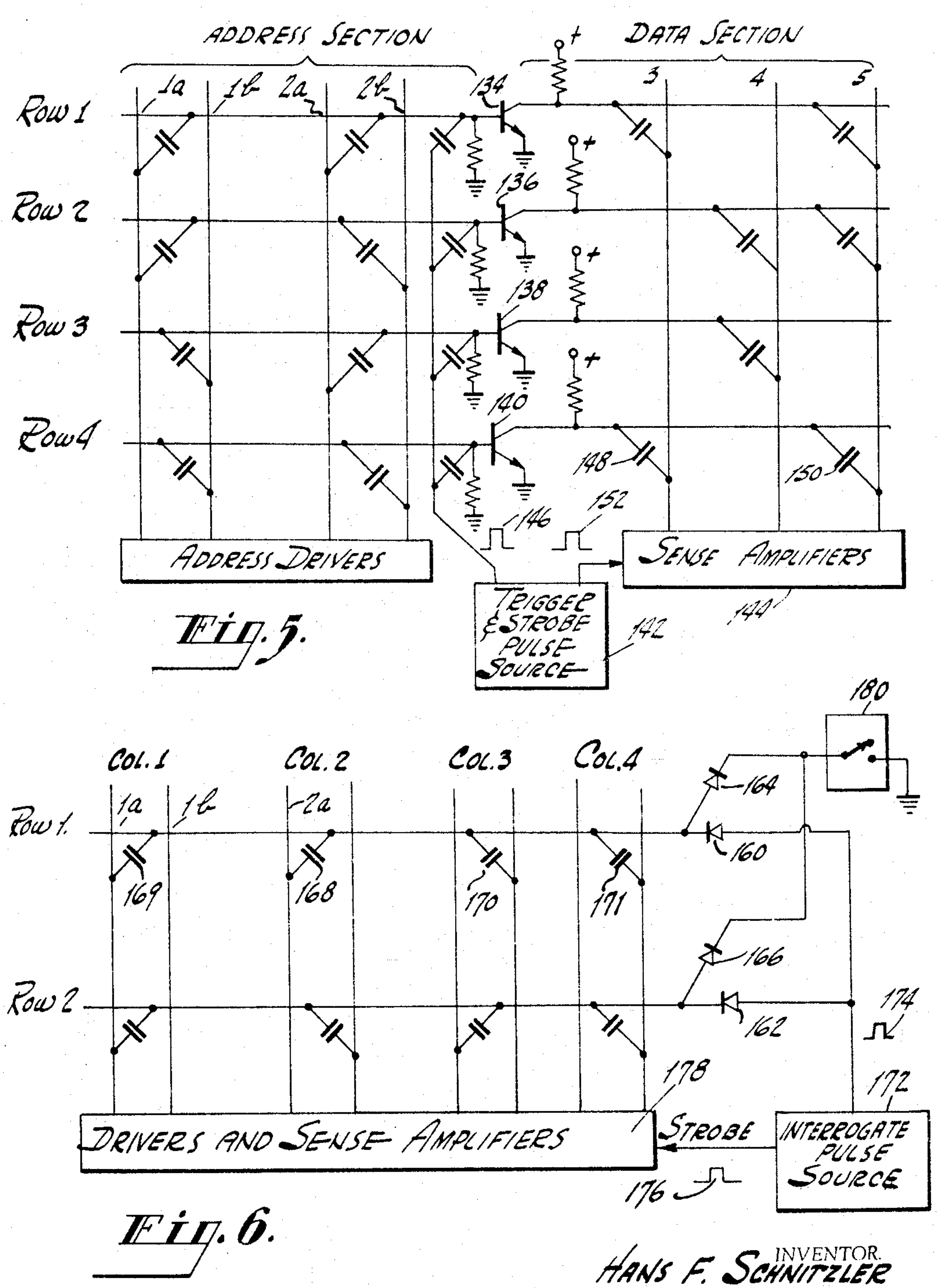
FIG. 5 is a block and schematic diagram of a memory which includes a transistor connected to each row of the memory.
FIG. 6 is a block and schematic drawing of a content addressed memory which utilizes the charge storage of the capacitor memory elements in the operation of this memory.

The memory of FIG. 5 is in some respects similar to the memory of FIG. 1 in that it has an address section and a data section. However, neither the coupling diodes 69, 71, 73 and 81 nor the bistably biased tunnel diodes 72, 74, 76 and 80 are employed. Instead, the transistors 134, 136, 138 and 140 essentially serve the purpose of both of these elements.

In the operation of the circuit of FIG. 5, the bases and emitters of the transistors are connected to ground so that the transistors are normally in the "off" condition. The address drivers are then turned on. Assume that the address word is 1, 1, that is, a relatively short, positive voltage pulse applied to leads 1*a* and 2*a* and leads 1*b* and 2*b*, connected to ground. This tag word causes positive signal pulses to appear on the row 1, row 2 and row 3 leads. These signals are of sufficient amplitude to drive the transistors 134, 136 and 138 into saturation. As in the case of monostably biased tunnel diodes, the transistors 134, 136 and 138 remain in the quasi-stable condition (in saturation for the transistors and in the high voltage state for the tunnel diodes), for a length of time after the tag word pulses have terminated dependent upon such circuit parameters as the type of transistor employed and the lifetime of minority carriers in the base region, the values of resistors, and so on. After the tag word pulses have terminated, and during the time the transistors 134, 136 and 138 are in saturation, the trigger and strobe pulse source 142 applies a positive read-out pulse 146 to the bases of all transistors. At the same time, it applies a positive pulse 152 to the sense amplifiers 144. The trigger pulse 146 has little effect on transistors 134, 136 and 138. However, it drives transistor 140 from its "off" state into saturation. The large change in voltage which occurs at the collector of transistor 140, a negative going voltage, causes sense signals to be coupled through capacitors 148 and 150 to the column 3 and column 5 leads. The sense amplifiers connected to these columns are enabled during this interval by the pulse 152, and produce outputs. The entire output word is 101, the word stored in the data section of row 4.

The memory of FIG. 5 can be made completely content addressable by employing for the address section a matrix which duplicates the data section. Arranged in this way, a tag word can be applied to any one or more of the columns in the address section to cause the read-out of the corresponding entire word from the data section.

In the memories which have been discussed so far, there is associated with each row line of the memory an element which has either bistable or monostable storage properties. In the memories of FIGS. 1 and 2, tunnel diodes which are bistably biased are employed. In the memory of FIG. 3, monostably biased tunnel diodes are employed. In the memory of FIG. 5, the charge carrier storage which occurs in transistors is employed for temporary storage.

In the memory of FIG. 6, the only charge storage which is necessary is that of the data storage elements themselves, namely the capacitors. In the memory of FIG. 6, there are 4 columns and 2 rows. Each of the rows has connected to it a conventional, positive resistance diode, diodes 160 and 162, respectively. There are also associated with the respective rows the diodes 164 and 166 whose purpose is to permit discharge of the capacitor storage elements.

In the operation of the memory of FIG. 6, assume that the tag word consists of 2 bits applied to columns 1 and 2, respectively. Assume these bits to be 0, 1, that is, a positive voltage applied to lead 1*b*, a positive voltage applied to lead 2*a*, and leads 1*a* and 2*b* grounded. The positive voltage applied to lead 1*b* does not couple to either row. However, the positive voltage applied to lead 2*a* is coupled through capacitor 168 to row 1, causing this capacitor to charge. The return path for the current flowing into capacitor 168 is through the remaining capacitors 169, 170 and 171 to ground. The charge thereby accumulated on the respective capacitors, back biases diode 160.

During the time the capacitors 168–171 are charged, the interrogation pulse source 172 applies a positive read-out pulse 174 to diodes 160 and 162. The pulse amplitude chosen is insufficient to overcome the back bias on diode 160 and therefore this diode remains cut-off. However, the pulse does pass through diode 162 and is coupled through the capacitors connected to row 2 to the various column leads. During the time the interrogation pulse 174 occurs, a strobe pulse 176 is applied to the sense amplifiers of block 178 to permit these amplifiers to receive and amplify the sense signals appearing on the various columns.

After the interrogation pulse interval, a switch 180 is closed to connect the cathodes of diodes 164 and 166 to ground and discharge the charge accumulated on the various capacitors through diodes 164 and 166. While the switch 180 is illustrated as a mechanical switch, it is to be appreciated that an electronic switch may be preferred in practice.

In the memory of FIG. 6 and in certain others to be discussed, in the "worst case," the back bias developed on a diode such as 160 of FIG. 6 is $V_d/n$, where $V_d$ is the voltage applied by one column driver, and $n$ is the number of bits stored on a line. This is due to the voltage divider action of the bit storage elements. For example, in the case discussed above, of the tag word 0, 1 applied to columns 1 and 2 of the circuit of FIG. 6, the voltage developed at row 1 is:

$$V_d\left(\frac{\text{Impedance } Z_p \text{ of capacitors 169, 170, 171 in parallel}}{\text{Impedance of capacitor } 168+Z_p}\right)=\frac{V_d}{4}$$

Therefore, the interrogate pulse amplitude should always be somewhat lower than $V_d/n$.

Figure 7:
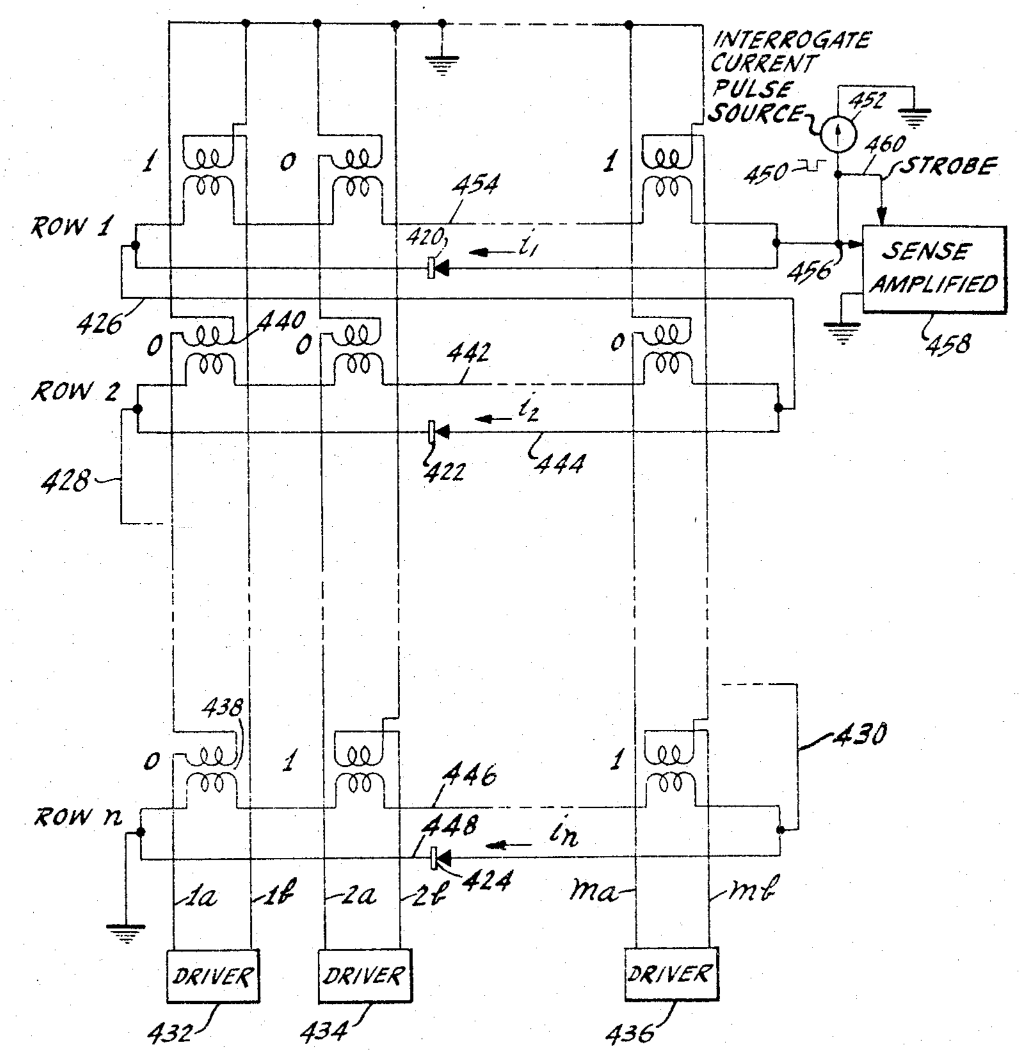
FIG. 7 is a block circuit diagram of a content addressed memory employing inductor information storage elements.

A content address memory operating on principles similar to those discussed above in connection with FIG. 6, but employing inductive elements (transformers) as the bit storage devices is shown in FIG. 7.

As in the other memories, each column of the memory has an *a* lead and a *b* lead. The primary winding of a transformer coupled to an *a* lead indicates storage of a 0 and the primary winding of a transformer coupled to a *b* lead indicates storage of a 1. The rows of the memory include, in series, the secondary windings of transformers. (The terms "primary" and "secondary" as employed here are with respect to the drivers 432, 434, 436.) There is a diode connected in shunt with each row completing loops such as that of branch 442 and branch 444 for row 2 and the loop of branch 446 and 448 and row *n*. Three such diodes are shown at 420, 422 and 424, respectively.

All of the rows of the memory are connected in series. For example, row 1 is connected in series with row 2 via lead 426. Row 2 is connected in series with row 3 (not shown) via lead 428 and row $n-1$ (not shown) is connected in series with row *n* via lead 430.

In the operation of the memory of FIG. 7, one or more of the drivers 432, 434 and 436 is activated to apply the desired tag word to the memory. For example, assume the tag word to consist of only one digit, a 1, applied by the driver 432 (a positive voltage pulse applied to column 1*a* and column 1*b* grounded). The positive voltage produced by the driver is coupled through transformers 438 and 440 to rows 2 and *n*. The currents $i_2$ and $i_n$ thereby induced in the secondary windings of the respective transformers thereupon circulates in the loops 442, 444 and 446, 448, respectively in the directions indicated by arrows $i_2$ and $i_n$. These currents are in the forward direction with respect to the diodes 422 and 424, respectively. (If, instead, the tag bit were a 0—a positive voltage applied to a *b* column, any row coupled to that column by a transformer would also develop a current in its loop which was in the forward direction with respect to the diode in that loop. For example, if a positive pulse is applied to column 2*b*, the current $i_n$ flows in the forward direction through diode 424.) During the time the currents $i_2$ and $i_n$ are flowing, a negative-going current pulse 450 is applied to the series connected rows by the current pulse source 452. The amplitude of this pulse is somewhat lower than that of the current $i_2$ or $i_n$. Accordingly, if this current reaches row 2, for example, the diode 422 continues to conduct and row 2 looks like a low impedance. In each case, the current pulse 450 sees two parallel branches such as 422 and 424 in each row. However, the branch such as 442 has a high impedance, in view of the series connected secondary windings of the transformers (actually primary windings with respect to the interrogate current pulse source 452), so that the pulse 450 takes the second path such as 444, provided the diode in the second path is conducting.

In the present example, it was stated that the diodes 422 and 424 were conducting. However, diode 420 is in a non-conducting condition. Therefore, when the interrogate current pulse 450 is applied, the diode 420 presents a high impedance to this pulse. In a similar manner, the branch 454 of row 1, made up of series connected secondary windings of transformers, also "looks like" a high impedance to the pulse 450. Accordingly, a relatively high voltage develops at the input terminal 456 of the sense amplifier 458. During the interval that this high voltage appears a strobe pulse is applied to the sense amplifier via lead 460. Therefore, the sense amplifier is active and produces an output. This output indicates that there is at least one word in the memory (in the present instance the word stored in row 1) which corresponds to the tag word.

In the arrangement of FIG. 7, sense amplifiers may be connected to the respective columns in order to read out the word or words stored in the memory in a manner such as already discussed. Alternatively, the interrogation routine described later in connection with FIG. 10 may be employed. This interrogation routine requires only a single sense amplifier such as 458. As is explained later, in order to read-out the word or words stored, the states of drivers 434 and 436 are changed until the states of the drivers agree with the word stored in a particular row.

A greatly simplified content addressed memory, which requires no charge storage, is shown in FIG. 8. The bit storage elements of the matrix are resistors and the read-out pulse 212 is applied to the rows through diodes 190, 192 and 194, respectively. A resistor connected between an *a* column lead and a row, such as resistor 198, represents storage of a 0. A resistor connected between a *b* column lead and a row, such as resistor 200, represents storage of a 1.

In the operation of the memory of FIG. 8, the tag bits applied are direct currents (actually, relatively long, flat topped pulses). Assume the tag word to be 1, 1, again in columns 1 and 2, respectively. This corresponds to a positive voltage applied to column leads 1*a* and 2*a* and column leads 1*b* and 2*b* connected to ground. All other column leads 3*a*, 3*b*, 4*a*, 4*b*, are connected to ground. The positive driver voltages are coupled through resistors 196, 197 and 198 to rows 1 and 3, back biasing diodes 190 and 194. The current applied to these rows also couples through the remaining resistors connected to the rows such as 200, 202, 204, 206 and 208 to the column leads 2*b*, 3*b* and 4*b*, respectively. Thus, direct current is applied to the columns at which sense signals must later be detected.

During the time the drivers for the tag word are on, the interrogation pulse source 210 applies a positive read-out pulse 212 to the three diodes 190, 192 and 194. The diodes 190 and 194 are back biased and do not conduct this pulse. However, diode 192 does conduct the pulse to the row 2 lead. The result is a small amplitude relatively short duration pulse (the sense signal) coupled through resistors 207, 209, 211 and 213 to the sense amplifiers of blocks 214, 216, 218 and 220. In some cases as, for example, in the case of the column 3*b* lead, this sense signal (a small amplitude, short duration, current pulse) is superimposed on a direct current level—the direct current applied by the drivers from rows 1 and 3 through resistors 202 and 206 to column lead 3*b*. It is possible and practical to separate this sense signal from the direct current level even though the direct current level may be much much larger in amplitude than the sense signal.

FIG. 9*a* is a block and schematic drawing of a sense amplifier circuit (shown in dashed block 469) which is suitable for detecting a low level sense signal superimposed on a relatively large direct current level. An inductor 472 is connected between the input lead 478 of the sense amplifier circuit and ground. Also, a pair of back-to-back connected, "high leakage" diodes 474 and 476 in series with a resistor 477 are connected between the input lead 478 and ground. (High leakage implies that the diode passes "substantial" current in the reverse direction of a magnitude which is somewhat greater, for example, than the magnitude of the "sense" current pulse corresponding to the voltage pulse 502 of FIG. 9b. A number of commercially available germanium diodes do operate in this way and pass reverse currents of say 20–30 microamperes or more, whereas the sense current pulse may have an amplitude of say 10 microamperes.) The signal voltage input to the amplifier 470 is taken from the connection 479 between the diode 476 and the resistor 477. The value chosen for resistor 477 will depend upon the sense current amplitude and other circuit parameters. However, for a current of 10 microamperes a value of about 1000 ohms may be employed.

The driver is shown schematically in FIG. 9 as including a switch and a battery 482. In practice, transistor switching circuits may be used instead. In the position of the switch shown, the column *a* lead is connected to ground and a positive voltage is applied to the column *b* lead. (In practice, the ground connection may be through an inductor such as 472 of the sense amplifier associated with the column lead.) This positive voltage causes a current to flow through resistor 484 to row conductor 486 and through resistor 488 to column lead 490. This column lead is the one connected to the sense amplifier circuit 469.

The operation of the circuit may be better understood by referring both to FIG. 9*a* and FIG. 9*b*. When the driver is turned on, corresponding to the closing of switch 480 to connect the battery to the *b* column, the leading edge 492 of the direct current driver pulse occurs. The signal which results due to this transient couples through resistors 484 and 488 to the lead 478. It causes a sharp voltage peak to occur across the inductor 472 as indicated by the dashed area 494 in FIG. 9*b*. However, the current in the diode branch is limited to the leakage current (the reverse current) which passes through diode 476, as indicated by the + clamping level dashed line 496 in FIG. 9*b*. This is desirable to avoid overloading effects. The relatively small portion 495 of the pulse applied to the amplifier, has little effect on the amplifier output at lead 498 as the amplifier is in an "off" condition during the interval of this pulse.

The interrogate or read-out pulse (corresponding to pulse 212 of FIG. 8) is applied to row 486 during the time the driver is applying its direct current level to the same row. The portion of this read-out pulse which appears at the input to the amplifier is shown at 500 in FIG. 9*b*, superimposed on the direct current level due to the driver. The pulse corresponding to 212 divides among many paths so that the portion thereof such as 502 which reaches a sense amplifier is only a fraction of the amplitude of the original pulse. The inductor 472 offers a high impedance to the sense pulse and the current amplitude in the diode branch is below the level at which the diodes 474 and 476 clamp. Therefore, current passes through the diodes and a voltage pulse 502 appears across the resistor 477 as indicated in FIG. 9*b*. During the interval of this pulse, the strobe pulse 504 is applied to the input lead 504*a* of amplifier 470. Accordingly, the amplifier produces an output 506.

When the driver pulse is terminated, a relatively high, negative-going signal appears on lead 478. As in the case of the positive-going pulse due to the leading edge of the driver pulse, the current in the diode branch is limited to the leakage level of diode 474. The amplitude of the remaining portion 509 of this pulse is such that the amplifier 470 is not adversely affected.

While the circuit of FIG. 9*b* employs back-to-back connected high leakage diodes at the input to the amplifier, other clamping means are possible. For example, two biased, oppositely poled diodes may be connected in parallel between the input lead 478 and ground. Each of the diodes may be reverse biased to a volt or so. In this circuit, the resistor 477 is omitted and the input lead 478 connects directly to the amplifier. An advantage of the circuit shown in FIG. 9*a* over this more conventional circuit is that the time constant of the circuit of FIG. 9*a* is much lower permitting higher operating frequencies.

This is because in the circuit shown, the dynamic resistance shunting the inductor (the diodes plus resistor) is high thereby providing a relatively low $L/R$ time constant.

The content addressed memory shown in FIG. 10 is a simplified version of the memory of FIG. 8 and which employs a different interrogation routine. Only drivers are connected to the columns. A single sense amplifier 250 is employed for the entire matrix rather than a sense amplifier per column. This single sense amplifier is coupled to the portion 252 of the interrogate line which is common to all of the rows as, for example, by a transformer 253. The stroke pulse 255 applied to the amplifier 250 is concurrent with the interrogate pulse 254.

In the operation of the memory, a cycle consists of first applying drive current to one or more of the columns then, during the time that the drive current is flowing, applying an interrogate pulse 254 to all of the rows and, during the interrogate pulse interval sensing whether or not current is passing through line 252. In the table which follows and describes the operation, the characters representing the driver states are 1, 0 and $\phi$. 1 represents a positive voltage applied to the *a* column and the *b* column connected to ground. 0 represents a positive voltage applied to the *b* column and the *a* column connected to ground. $\phi$ represents both the *a* and *b* columns connected to ground.

The four character word appearing under the "Driver States" column of the table refers to the states of drivers 214*a*, 216*a*, 218*a* and 220*a*, in that sequence. The word YES appearing in the "Sensed Condition" column indicates that a current is present at lead 252 during the interrogate pulse 254 interval and the word NO means no current is present in lead 252 during this interval. In other words, a NO indicates that all of the diodes 190, 192 and 194 are back biased.

When a number appears in the "Word Selected" column it means that the diode connected to the corresponding row is not back biased. For example, in cycle 2, a 0 is applied by driver 214*a* and a $\phi$ is applied by the remaining 3 drivers. The 0 applied by driver 214*a* causes diode 192 to be back biased. However, diodes 190 and 194 for rows 1 and 3 are not back biased and therefore the words selected by this character configuration ($0\phi\phi\phi$) are the 1 and 3 words, that is, the words stored in rows 1 and 3. In a similar manner, in cycle 6, the 4 drivers are in the states 0011, respectively, and this causes diodes 190 and 192 to be back biased. Diode 194 is not back biased. Accordingly, when the interrogate pulse 254 is applied, a current (a YES) is sensed by amplifier 250. When no driver is in the $\phi$ state and a YES answer is obtained, a word may be read out of the memory. The word is the actual state of the drivers 0011. Note that this word corresponds to the word 0011 appearing in row 3, that is, word 3. Therefore, one of the words in the memory has been isolated (selected). The asterisk in the table indicates, in each case, that a word has been selected.

| Cycles | Driver States | Sensed Cond. | Words Selected |
|---|---|---|---|
| 1 | $\phi\phi\phi\phi$ | Yes | 1, 2, 3. |
| 2 | $0\phi\phi\phi$ | Yes | 1, 3. |
| 3 | $00\phi\phi$ | Yes | 3. |
| 4 | $000\phi$ | No | None. |
| 5 | 0010 | No | None. |
| 6 | 0011 | Yes | 3.* |
| 7 | $01\phi\phi$ | Yes | 1. |
| 8 | $010\phi$ | No | None. |
| 9 | 0110 | No | None. |
| 10 | 0111 | Yes | 1.* |
| 11 | $1\phi\phi\phi$ | Yes | 2. |
| 12 | $10\phi\phi$ | No | None. |
| 13 | $110\phi$ | No | None. |
| 14 | 1110 | Yes | 2.* |
| 15 | 1111 | No | None (end routine). |

A general discussion of the method above for reading out a content addressed memory appears in an article "Retrieval of Ordered Lists from a Content-Addressed Memory" by M. H. Lewin, RCA Review, June 1962, vol. XXIII, No. 2, page 215 and in the Frei and Goldberg reference noted therein. This read-out method is applicable also to a number of the other memories which have been discussed.

The description in connection with FIG. 9*a* above gives details of sense amplifiers suitable for use in a number of the memories of the present invention. In other of the figures discussed above, many of the stages are illustrated by blocks. More detailed descriptions of suitable drivers and sense amplifiers appear in the co-pending Lewin application cited above. The Lewin application also includes details of the logic stages which may be employed in retrieving more than one word from the memory in accordance with the Lewin interrogation routine. However, the reader may, if he wishes, consider the drivers merely to consist of current sources in series with mechanical switches. These can be employed to practice the invention. However, the speed obtainable is relatively low so that electronic means such as transistor stages are preferable.

The discussion so far has dealt with the electrical configurations of content addressed memories. The remainder of this application deals with physical realizations of these memories. While these realizations are applicable to all of the memories which have been discussed, the memory of FIG. 10 has been chosen as illustrative.

In a physical memory, the resistors defining storage locations of FIG. 10 and the row and column conductors may appear on cards. Each card stores one word, that is, each card may be thought of as comprising one row of the memory. In one memory, the cards are of the type generally known as IBM cards, each card measuring approximately 7⅜ x 3½ inches. Each card is formed with 60 resistors on one surface thereof providing 60 storage locations (although much higher packing densities are possible). In other words, each card stores a 60 bit word. A memory module consists of a plurality of cards stacked one over another. The column leads for the memory consist of conductors which extend through the stack, as is discussed in more detail shortly.

In this physical memory, the diodes analogous to diodes 190, 192 and 194 of FIG. 10 may be formed on the card itself. This is discussed later. Alternatively, the diodes may be arranged in a separate chassis as described next below. In this case, each card has a lead extending from the row lead to the diode.

To simplify the discussion which follows, the number of storage locations in each card has been reduced in a number of the illustrations. One such illustration is FIG. 11. Here, the memory card may be formed of paper, just like a typical IBM card or of plastic or of some other, preferably flexible, insulating substrate. The row conductor, analogous to conductor 260 of FIG. 10, is shown at 260 in FIG. 11. The card stores a 6 bit word. The 6 resistors 261–266 (1 resistor per bit) are each connected at one end (which may be considered one terminal) to the common row lead 260. Each resistor is also connected at its other end (terminal) to two terminals 268*a* and 268*b*, respectively. The 268*a* terminal is the one which connects to the *a* column in each case and the 268*b* terminal is the one which connects to the *b* column in each case. At the center of each terminal there is an opening which aligns with a hole punched through the card. It is in this hole that the column conductor is located, as is discussed in more detail shortly.

Referring to FIG. 10 again, each resistor is connected either to an *a* column lead or to a *b* column lead, but not to both column leads. The same holds for the memory of FIG. 11. Initially, each resistor is connected to both *a* and *b* terminals, as shown in FIG. 11. However, as explained shortly, information is written into the memory by breaking the connection to one of the column terminals.

The card of FIG. 11 also includes 6 additional terminals 270–275, respectively. Each of these terminals is formed with a central opening which aligns with a hole punched through the card. The purpose of these terminals is to provide connections between the row leads of the different cards and the diodes for the respective row leads. This also is explained in more detail shortly.

The card of FIG. 11 may be made by one of a number of different batch fabricating techniques. In one such technique, a templet (stencil) is formed with the desired resistor pattern, as is shown in FIG. 11. The templet is placed over the substrate consisting of a paper card or of some other flexible medium as, for example, plastic or other insulating material. The particular substrate employed is not critical, however, it should be a relatively good insulating material (paper is adequate), and it should preferably be inexpensive. A resistor slurry is then placed over the templete and "doctor bladed" into the cut-outs so as to form the resistor pattern on the substrate.

After the resistors have dried, the templet is removed and a second templet containing the conductor pattern is laid down over the substrate. If necessary, heat or chemical curing may be employed to fix the resistors in place. Two or more templets may be required to produce the desired conductor pattern in view of the many cut-outs in the templet. Or, if a "silk screen" is employed, that is, a templet with mesh in the openings, only one templet is required. For purposes of illustration, only one templet is shown. After the conductor templet is in place, an electrically conductive slurry is placed over the templet and forced through, as by screening or doctor blading, the cut-outs. The pattern in the templet is such that the conductor extends over both ends of the resistors which have been laid down, forming positive electrical contact to the resistors. After the conductor has dried, the templet is removed. Again a heat or other curing step may be employed, if desired, to "fix" the conductor. Thereafter, holes are stamped through the conductor and card to provide the openings for the column conductors and the "riser" conductors which will extend through terminals 270–275. (Alternatively, the holes may be placed in the cards prior to the time that the patterns are formed on the cards.) The product which results is the card shown in FIG. 11.

Different types of materials may be employed for the conductors and resistors. In one embodiment of the memory, a silver epoxy paint, which is commercially available, was employed for the conductors. The paint includes flake silver, epoxy resin and a solvent and, as one example, is available from Epoxy Products Co. as "Silver Paint 3040." Similar products are available from other manufacturers. The solvent was permitted to evaporate from the paint at room temperature. Then, the paint was reconstituted with Carbitol, a commercially available slow drying solvent, until the viscosity was in the region of 100 poises. Thereafter the reconstituted silver paint was screened to produce the desired conductor pattern. The reconstituted paint flowed easily and did not clog up the "silk screen." The silk silver conductor pattern was permitted to dry at room temperature.

A resistor formulation which is suitable for making the resistors is as follows:

130 grams type G Carbon Black (Ficher Scientific Co.)
240 milliliters of Butyl Cellosolve Acetate
205 milliliters of Methyl-Ethyl-Ketone (MEK)
165 grams of "Vitel" polyester resin (Goodyear Co.)
160 milliliters MEK
10 grams Silicon Dioxide In making the mixture, the carbon black is mixed with 205 milliliters of ethyl-ketone. In a separate container, the silicon dioxide is ball milled with the 160 milliliters of MEK. Thereafter, the two mixtures are placed together and the butyl-Cellosolve acetate and polyester resin are added and all ingredients mixed together.

The resistor formulation above was fast drying and a metal templet was employed to avoid clogging. The templet material was .002" thick copper foil and was produced by etching. The resistor paint was applied to the cards by pushing the slurry with a razor blade through the holes in the template. Drying of the resistors was permitted to take place at room temperature.

Another resistor formulation, this one suitable for "silk screening," consists of 30% Carbon Black, 70% resin binder and enough Carbitol added to produce a viscosity of 100 poises.

It is also possible to lay down the resistor-conductor pattern required by using printing press techniques. A Vandercook offset type proof press may be employed. In a press of this type, a printing plate is etched so as to leave a raised pattern of the desired configuration. An inking roller is then moved over the plate to deposit the required amount of conductive or resistive ink, according to the pattern employed. Thereafter, a rubber covered impression cylinder moves over the plate and picks up the ink pattern. The cylinder thereupon passes over the card and lays the pattern down on the card.

An enlarged view of one corner of a "60 bit" card appears in FIG. 14. FIG. 15 is an enlarged cross-section along lines 15—15 of FIG. 14. (In practice, the card thickness is substantially smaller than the hole diameter.) FIG. 15 shows the conductor terminal extending slightly above the surface of the card and essentially forming a peripheral ridge around each hole through the card. This slight protrusion above the card surface is useful in making the column connections to the terminal and in preventing the column connections from shorting to undesired portions of the card, as is explained in more detail shortly.

A perspective sketch of a memory module is shown in FIG. 16. It consists of a stack of cards, each card storing one 60 bit word. *a* and *b* column leads extend through the cards. There is one *a* lead and one *b* lead per storage location giving a total of 120 column leads which extend through the card. There are also a number of riser leads which extend through the card. These riser leads connect to terminals such as 270–275 of FIG. 11. Each riser lead connects to a different card. If there are *n* riser terminals available on a card, then the maximum number of cards in a module is *n* cards and the number of riser leads is also *n*.

At the bottom of the pack of cards there are connections from the riser leads and the column leads to the driver, sensing and logic circuits. These circuits include the diodes analogous to 190, 192 and 194 of FIG. 10. All circuits are included in the block 280.

A more detailed showing of a portion of the topmost card (card #1) in the stack of FIG. 16 appears in FIG. 17. The various column and riser leads are all in place. As is discussed in more detail shortly, these leads are formed preferably by placing molten metal into each hole and permitting it to solidify. The solidified metal engages each terminal surrounding the column as is discussed in detail shortly. Information has already been written into card 1. For example, resistor 290 is connected to represent a stored "one." This information may be written into the card by a special card punch which punches a hole in the area marked by the asterisk (the hole is not shown) so as to separate the lead 292 from the column 1*a* terminal 294. Alternatively, the conductor in the area of the asterisk may be abraded or otherwise removed from the surface of the card. (The asterisk is meant to indicate in a generic way, any method of removing the metal.) As a third alternative, the card may be manufactured with the *a* and *b* terminals such as 294, 295 separated from the lead 292 and information written into the card by forming a conductor (by printing, painting, evaporating, doctor blading or other means) between a terminal such as 294 and the conductor 292. However, of these alternatives, it is found that punching a hole through the card is the simplest and cheapest way, at present, of writing information into the card.

Resistor 296 of the card, as connected, represents a stored "zero." Again, this is preferably done by a card punch which punches out a portion of the conductor between 292 and terminal 297. The portion of the conductor removed is one which is convenient for the punch or typewriter said may be in the area shown or, alternatively, in the dashed area 298.

The remaining two resistors shown, that is, resistors 300 and 301, are each connected to store a "one." In each case the asterisk indicates where the connection has been deleted as by punching out a hole or other means.

Referring again to FIG. 10, it is seen that it is necessary to connect each row to a diode. For example, row 260 must be connected to diode 190 by a lead such as 306. Lead 306 in FIG. 17 is the card 1 riser lead which is also legended as such. The terminal 308 is in electrical contact with this riser lead. In order to connect the row 1 lead 260 to this terminal, a conductive connection 310 is painted or otherwise formed on the card between the row conductor 260 and terminal 308. The remaining riser terminals 312, 314, 316 and so on are each connected to their respective riser leads. However, they are disconnected from the row lead 260. Therefore, there is one and only one riser lead connected to the row conductor 260 on card 1.

FIG. 18 illustrates the second card from the pack of FIG. 16. Again, a word has been printed onto the card by deleting the connection to either the *a* or *b* column (but not both) of each resistor. Thus, resistor 290–2 connects to the *a* column, representing storage of a "zero." Resistor 296–2 connects to the *a* column representing storage of a "zero." Resistor 300–2 connects to the *b* column representing storage of a "one" and so on. The card #1 riser lead 302 connects to the card #2 riser terminal 308–2. However, terminal 308–2 is not connected to the row lead 260–2 of card #2. The second riser terminal 312–2 is the only one on card #2 which connects both to the card #2 row lead 260–2 and a riser lead. The connection is shown at 330.

The remaining cards in the pack of FIG. 16 are not shown. However, it is to be understood that each stores a 60 bit word and each connects to a different riser lead.

While in the construction shown, the riser terminals are all initially disconnected from the row conductor, a different construction is possible. This entails initially connecting all of the riser terminals to the row conductor and then disconnecting all except one terminal when the card is written. The disconnection may be performed by a special puch or typewriter which breaks all except one connection to a riser terminal as, for example, by punching holes through the cards.

The number of resistors and the number of riser terminals which are possible on a card depend on a number of factors. One is the physical size of the resistor elements and the conductors. Another is the spacing between conductors which is necessary to provide adequate insulation. Another is the physical size of the card, and so on. As already mentioned, in one memory, 60 bits are stored on a card. The exposed portions of the resistors are approximately 3/10" long, 1/10" wide and 3/4 mil (milli-inch) thick, and the conductors have a maximum width of about 1/10" and a thickness of about 3/4 mil. There are 120 riser terminals per card. The number of cards per module is therefore 120.

An enlarged cross-section view of one form of terminal construction appears in FIG. 19. The card is shown at 340 and the terminal at 342. The terminal extends from the top surface of the card into the hole and covers the inner surface of the hole. In this method of construction, the holes are punched in the card before the conductor pattern is laid down. Then, the conductor pattern is laid down through a suitable mask as, for example, by evaporation in a partial vacuum spraying, screening, printing or other means.

If the pattern is laid down by evaporation in a partial vacuum, it is preferred to use metal alloys which evaporate at relatively low temperatures to prevent damaging the substrate. This is especially important in the case of substrates made of plastic, paper or other temperature sensitive substances.

Spraying of a conductive material such as silver epoxy paint through a mask produces conductors which adhere to substrates and which have good conductivity and good deformability. The latter characteristic permits the terminals to act like good gaskets, that is, when the cards are stacked one over another and placed under pressure, the terminals deform and form a good seal. This seal prevents the liquid conductors which are subsequently placed in the aligned holes from leaking between the cards as discussed later.

It is also possible to lay down the conductor pattern by spraying molten low temperature metals or alloys through suitable masks. The conductor chosen may be one which readily "wets" the alloy used for the column conductors. If this is done, then contact reliability, that is, the reliability of the contact between the column and the terminal, may be improved.

FIG. 20 illustrates a portion of a stack of cards showing how the column conductors and riser conductors interconnect the terminals 342 on the various cards. A conductive fluid is employed to fill the open columns formed by the terminals and cards. The fluid fills the columns through the cards completely, forming conductive paths through the stack and simultaneously making electrical contact with the portion of each terminal which surrounds the inner surface of each hole. The fluid is prevented from leaking out of the column by the raised surface of the terminal and the underside of the next adjacent card as, for example, at 344, 346. A tight fit between these surfaces may be assured by placing the pack of cards under pressure as, for example, by clamping the cards in a press.

Preferably, all of the columns of cards are filled at once. This may be done by placing a blank card formed with appropriate holes as the topmost card in the pack, forming a rim around the peripheral surface of the pack so as to prevent any fluid which is poured on the top card from leaking over the edges of the pack, then, pouring the conductive fluid onto the top insulating card to permit the fluid to flow into the various holes. One or more blank cards (cards without holes) may be placed at the bottom of the pack to prevent the fluid conductor from leaking. Special low density (slightly porous) material may be used for these cards to permit the air from the columns of aligned holes to pass through these blank cards. In addition, a vacuum may be applied to all of the columns of holes through a suitable vacuum chamber coupled to the bottom card of the pack. The vacuum serves both to remove the air and to pull down the fluid conductor.

In addition to the above, pressure may be applied over the fluid well formed above the card pack to aid in forcing the fluid conductor to fill completely all of the columns of holes. This pressure may be obtained, for example, simply by the pressure head created by the fluid itself or by pneumatic, hydraulic or other means. Vibrating the pack may also be used to aid in filling the holes. Once the column holes have been filled, the excess fluid may be removed from the top card in the stack and the columns sealed at both ends.

The conductive material employed for interconnecting the terminals in the cards may be one which remains liquid as, for example, mercury. The density of mercury is such that it fills the column holes under its own weight, and provides very good electrical contact to the conductive terminals. Further, although mercury's electrical conductivity is only 2 percent that of copper, for column cross-sections of greater than 50 mils in diameter, the resistance is less than 0.3 ohm per foot. Increasing the column diameter reduces the column resistance still further.

Nevertheless, mercury does have its disadvantages. One is the toxicity of mercury vapor. Another is that sealing techniques are required to prevent the mercury from leaking out of the ends of the columns.

A preferred material to employ for making the column and riser leads is one which is a solid at room temperature but which melts at temperatures somewhat higher than room temperature and preferably lower than that at which the cards char or ignite. There are a number of suitable alloys of metal (sometimes known as low temperature solder) which are available having these characteristics. Some examples are commercially available products such as Asarcolo #117, Asarcolo #158, Asarcolo #255 or Asarcolo #281. These are made by the American Smelting and Refining Company, Federated Metals Division. In addition, there are numerous alloys of two or more of the following elements which meet the melting temperature and shrinking requirements for the column conductors: bismuth, antimony, cadmium, lead, tin and indium.

Again, there are a number of methods by which this (solder) material can be made to enter the holes in the cards. One is to place in each hole a rod made of the metal and having a height sufficient so that when the rod melts, the metal fills the column of holes to the top. In assembling the pack by this method, all holes are filled with low melting point rods and the pack of cards placed in an oven and heated to a temperature at which metal melts, but at which the cards are not damaged. Another way in which the rods can be melted is to employ high frequency, induction heating. This method is rapid and simple and no oven is required.

When using induction heating, the radio frequency coils are positioned to completely surround the card pack. The coils are placed to maximize the inductive heating of the conductive rods positioned in the holes and to minimize the heating of the printed conductive wiring on the cards themselves. This is easily done as the conductors on the card and the column conductors are at right angles to one another. After the coils are in place, sufficient radio frequency excitation is applied to melt the conductive rods.

In a memory employing material for the conductors which hardens somewhat above room temperatures, it has been found that very good low resistance connections are obtained. Further, the hardened conductors hold the cards of the pack together in a very tight, self-supporting, rigid configuration. Further, if desired, terminals may be embedded at the bottom of each column, these terminals being held in place by the solidified conductor. Alternatively, the conductors may be made to come flush with the bottom insulator card or if desired, with a base plate formed with holes which align with the holes in the card. This bottom card or plate serves as a support for the entire pack of cards. With flush terminations of this type, contact to the various column and riser leads is obtained with resilient brushes, such as used, for example, to read punched IBM type cards.

In FIG. 20 it is seen that the main contact between conductors 348 and the terminals 342 is at the portion of each terminal which coats the inner walls of the holes. However, this type of terminal construction is somewhat more difficult to achieve than the construction shown in FIG. 15, for example. With the latter type of construction, it has been found possible to make good electrical contact to the successive terminals by causing the holes in the cards and the corresponding printed terminals to be staggered with respect to one another as, for example, is shown in cross-section in FIG. 22.

Staggered terminals may be obtained in a number of ways. One is shown in FIG. 21*a*. Here, two types of cards are employed, one type "A" with terminals such as shown at 360 and the other type "B" with terminals such as shown at 362. Terminals 360 have a flat area at the top of each hole, whereas terminals 362 have a flat area at the bottom of each hole. Therefore, when the cards are alternately stacked, that is, type "A" followed by type "B," followed by "A," followed by "B" and so on, the configuration shown in FIG. 22 results. The column 348 of conductive material now makes contact with a relatively large portion of the top surface 364 of each terminal. It is found that very good electrical contact between the terminal and the conductor 348 results.

In the terminal construction of FIG. 21*a* the apertures 361 and 363 are of the same shape, but one aperture is oriented differently from the other aperture. It is these different orientations which provide the overlapping arrangement of FIG. 22 when the cards are stacked.

Figure 21B:
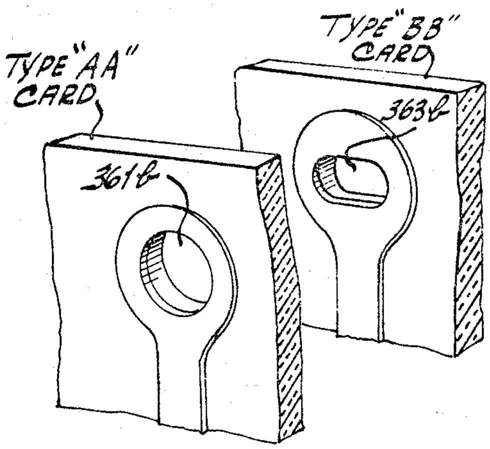

In the arangement of FIG. 21*b* the apertures 361*b* and 363*b* in the two different cards are of different shape. The aperture 361*b* is circular whereas the aperture 363*b* is elliptical. This type of construction too results in the staggered effect of FIG. 22 when the cards are alternately stacked.

It should be appreciated that the different terminal configuration of FIGS. 21*a* and 21*b* are only representative and are not to be taken as limiting. Many other shapes and orientations are possible which will result in staggered terminals. Further, it is even possible to use identical terminals on the two different cards provided the terminals on the "A" type cards are shifted slightly with respect to the terminals on the "B" type cards.

It is also possible to obtain staggered holes by employing identical memory cards. This can be done by staggering alternate cards as, for example, as shown in FIG. 23. The staggering may be achieved by cutting off an edge of every other card as indicated by the dashed area 370, and then sliding all of the cards down against a wall, indicated schematically at 372, of a jig or holder. This can be done, for example, by placing the longer and shorter cards alternately into this jig, turning the jig so that the wall 372 is at the bottom and then vibrating the jig so that all of the cards align with the wall 372. Now the cards may be clamped in place and then low temperature "solder" placed into the holes. The method previously described may be employed. Alternatively, a block of "solder" may be placed over a top blank card formed with holes, then the bundle of cards plus the solder may be placed in an oven and the melted solder caused to flow into the holes by gravity, and/or by applying suction to the holes, and/or applying pressure to the solder, and/or by vibrating the pack of cards, and/or by other means.

As a third alternative, staggered holes in the pack may be obtained by arranging the holes in each card so that when one card is rotated through 180° with respect to the other and the cards are aligned, the holes are staggered. However, this arrangement has the disadvantage that care has to be exercised in placing the cards in the appropriate position when typing information (punching holes) into the cards.

Figure 24A:
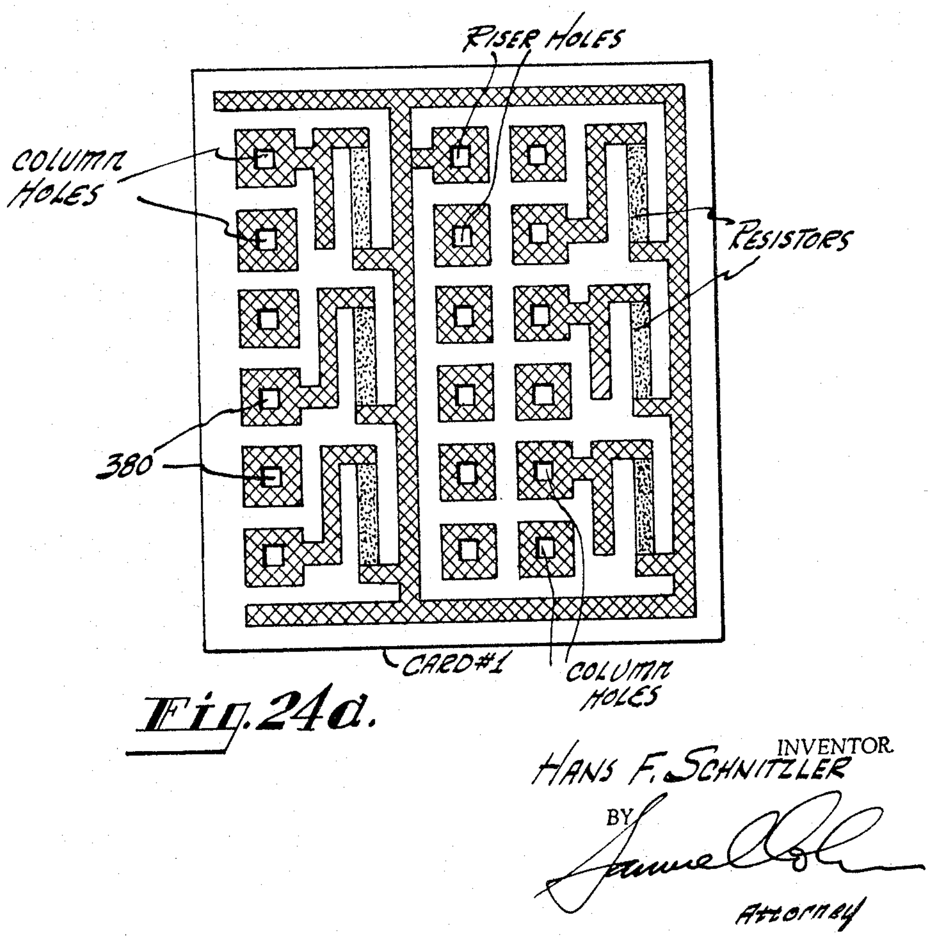
Figure 24B:
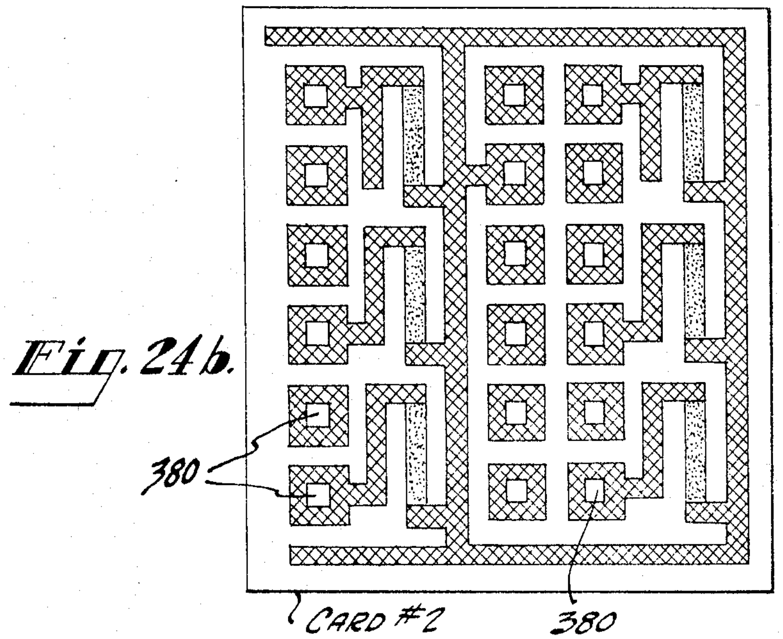
Figure 24C:
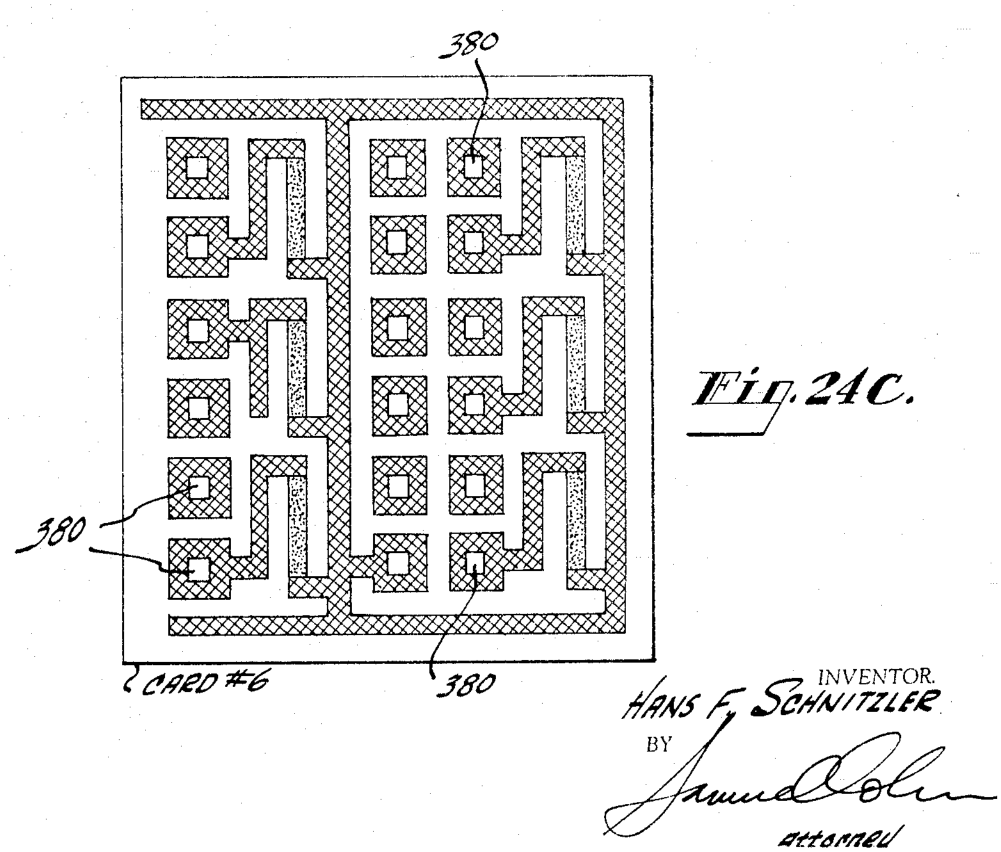
Figure 24D:
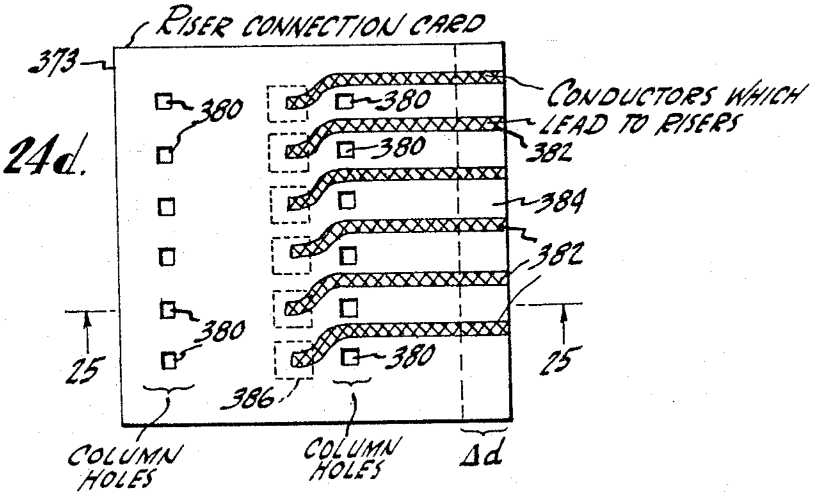

It was previously mentioned that the number of holes in the card available for riser leads to the rows determines the maximum number of cards which can be placed in a module. With the card of FIG. 11, for example, since there are only six holes (the ones in terminals 270–275) for riser leads, only six cards can be stacked. FIGS. 24*a*–24*c* show three of the six cards, namely, card 1, card 2 and card 6. If now a seventh card, such as 374 shown in FIG. 24*d*, is employed, the number of cards in the module can be increased substantially. The card of FIG 24*d* may be made of the same material as the cards of FIGS. 24*a* through 24*c*. However, there are no resistors on this card and the conductive pattern is different from that of the card of the remaining figures. Further, the card of FIG. 24*d* is longer by the amount $\Delta d$ than the card of FIGS. 24*a*–24*c*.

In the card of FIG. 24*d*, the column holes 380 are aligned with the corresponding column holes in the remaining cards. However, there are no holes corresponding to the riser holes in the other cards. Instead, there are 6 leads 382 which extend from the edge 384 of the card to the area of the card which mates with the riser holes. The area of the card over which the riser terminals lie is shown by dashed lines 386 so that the area through which the holes in the remaining cards appear will be more evident.

A portion of a stack of cards using the riser connection cards for every seventh card, is shown in cross-section in FIG. 25. The column conductor leads are continuous through the stack to permit any number of cards desired in each stack. The riser conductors, however, terminate at the riser connection card in each case. The conductors running to the riser leads are available at the upper surface 390 of each riser connection card. While not shown, it is to be appreciated that as in the embodiments previously discussed, the holes in the memory cards may be staggered with respect to one another, in order to permit more positive contact to the column and riser terminals on the respective cards. Also, in the drawing of FIG. 25, the column terminals on each card, while present, are not visible in view of the reduced size of the drawing.

In the memories discussed so far, the diodes corresponding to 190, 192 and 194 of FIG. 10 are not located on the card. This requires the leads 306 of FIG. 10 from each card. Further, this limits the number of cards which may be placed in a module for the reasons already discussed. In the arrangement of FIG. 26 there is located on each card a non-linear circuit element 400 such as the diode 190 of FIG. 10 or the tunnel diode of certain other of the figures. The diode may be printed on the card by one of the known batch fabricating techniques or, alternatively, may be a more conventional non-linear element positioned in a slot in the card so that it does not project appreciably above the surface of the card. The element 400 is connected between the extension 306 of the row lead and a terminal 402 to which a riser lead (not shown) which extends through the stack of cards connects.

The terminal 402 of FIG. 26, like the other terminals, is formed with a central opening which aligns with an opening in the card. The riser lead is located within this opening. This riser lead corresponds to the common connection 252 of FIG. 10 to all diodes. Therefore, using the type of card shown in FIG. 26, any practical number of cards desired may be employed in the stack since only a single riser lead is necessary. With a stack of this type, the interrogation technique discussed in connection with FIG. 10 is employed.

In the various construction techniques discussed above, the storage elements in each case are assumed to be resistors. It should be appreciated that the same techniques are applied to other storage elements. For example, capacitors can easily be formed on the cards as, for example, by placing one capacitor plate on one surface of the card and the second capacitor plate on the other surface of the card. Insulation between cards may be achieved by using a blank card with appropriately positioned holes between each pair of memory cards. As a second alternative, rather than using resistor elements, one may use inductors instead. These can be laid down on the same surface of the card as the row conductor and by techniques similar to those already described. As a third alternative, the data storage elements may be diodes. These may be laid down on the card by batch fabrication techniques.

What is claimed is:

1. In combination, a stack of insulator circuit cards, each having a printed circuit on one surface thereof, and each having a group of first holes in corresponding positions on the cards through which conductors pass which connect to the circuit on all cards, and each having a group of second holes in corresponding positions on the cards, the second holes receiving conductors which respectively connect to circuits on different cards, whereby the number of cards which can be stacked is normally limited by the number of second holes;

spacer cards located in the stack which are formed with holes in positions corresponding to the first holes in the circuit cards, with the conductors in the first holes passing therethrough, but which are imperforate and are formed with printed conductors in the areas of the spacer cards aligned with the second holes in the circuit cards; and conductors in the second holes which engage the printed conductors of the spacer cards and the insulator circuit cards.

2. In combination, a stack of insulator circuit cards, each having a printed circuit on one surface thereof, and each having a group of first holes in corresponding positions on the cards through which conductors pass which connect to the circuits on all cards, and each having a group of second holes in corresponding positions on the cards, the second holes receiving conductors which respectively connect to circuits on different cards, whereby the number of cards which can be stacked is normally limited by the number of second holes;

spacer cards located in the stack which are formed with holes in positions corresponding to the first holes in the circuit cards, with the conductors in the first holes passing therethrough, but which are imperforate in the areas of the spacer cards aligned with the second holes in the circuit cards;

printed conductors on the spacer cards aligned in one areas with the second holes in the circuit cards and leading to terminals which extend from the stack; and conductors in the second holes respectively connected to circuits on different cards and which second conductors engage the printed conductors of the spacer cards.

3. In combination, a stack of insulator circuit cards, each having a printed circuit on one surface thereof, and each having at least one hole in corresponding positions on the cards through which a first conductor passes which connects to the circuits on all cards, and each having a group of second holes in corresponding positions on the cards for second conductors to respective circuits on different cards, each said circuit being connected to not more than one second conductor, whereby the number *n* of cards which can be stacked is normally limited by the number of second holes in a card;

spacer cards located in the stack after each group of up to *n* circuit cards, which spacer cards are formed with a hole in a position corresponding to that of the first hole in the circuit cards, with the first conductor passing therethrough, but which are imperforate and are formed with printed conductors in the areas of the spacer cards aligned with the second holes in the circuit cards; and second conductors in the second holes respectively connected to different circuits on the circuit cards and which second conductors engage the printed conductors of the spacer cards.

4. In combination, a stack of insulator circuit cards, each having a printed circuit on one surface thereof, and each having a group of first holes in corresponding positions on the cards through which first conductors pass, each of which connects to the circuits on all cards, and each having a group of second holes in corresponding positions on the cards through which second conductors pass, each of which connects to a circuit on a different card, each said circuit being connected to not more than one second conductor, whereby the number *n* of cards which can be stacked is normally limited by the number of second holes in a card;

spacer cards which are larger in size than the circuit cards located in the stack after each group of up to *n* circuit cards, which spacer cards are formed with holes in positions corresponding to the first holes in the circuit cards, with the first conductors passing therethrough, but which are imperforate in the areas of the spacer cards aligned with the second holes in the circuit cards; and printed conductors on the spacer cards which engage the second conductors and which extend to portions of the spacer cards which extend from the stack.

5. A method of interconnecting terminals on a plurality of insulator cards, each card being formed with the same pattern of apertures therein and each card having on one surface thereof the same pattern of printed terminals which surround respective apertures, each said terminal comprising a relatively thin conductor layer which adheres to the surface of the card, comprising the steps of, removing an edge portion of one-half of the cards;

stacking the cards one over the other with those cards from which the edge portion has been removed alternating with the other cards;

aligning the edge of the cards from which the edge portion has been removed with one edge of the remaining cards in the stack of cards so as to obtain a stack of cards in which corresponding apertures of adjacent cards are partially overlapped, whereby continuous openings formed by the overlapping apertures extend through the stack of cards; and placing a fluid conductor into said openings.

6. A method of interconnecting terminals on a plurality of insulator cards, each card being formed with the same pattern of apertures therein and each card having on one surface thereof the same pattern of printed terminals which surround respective apertures, each said terminal comprising a relatively thin layer which adheres to the surface of the card, comprising the steps of, stacking the cards one over the other with the terminals on the same surface of the respective cards and with adjacent cards staggered with respect to one another so as to cause corresponding apertures in the respective cards to overlap;

placing molten metal into the apertures so as to make contact with the respective terminals; and solidifying said molten metal.

7. A method of interconnecting terminals on a plurality of insulator cards, each card being formed with the same pattern of apertures therein and each card having on one surface thereof the same pattern of printed terminals which surround respective apertures, each said terminal comprising a relatively thin layer which adheres to the surface of the card, comprising the steps of, stacking the cards one over the other with the terminals of the same surface of the respective cards and with adjacent cards staggered with respect to one another so as to cause corresponding apertures in the respective cards to overlap; and placing a fluid conductor into the resulting columns of apertures.

8. A method of interconnecting terminals on a plurality of insulator cards, each card being formed with the same pattern of apertures therein and each card having on one surface thereof the same pattern of printed terminals which surround respective apertures, each said terminal comprising a relatively thin conductor layer which adheres to the surface of the card, comprising the steps of, removing an edge portion of one-half of the cards;

stacking the cards one over the other with those cards from which the edge portion has been removed alternating with the other cards;

aligning the edge of the cards from which the edge portion has been removed with one edge of the remaining cards in the stack of cards so as to obtain a stack of cards in which corresponding apertures of adjacent cards are partially overlapped, whereby continuous openings formed by the overlapping apertures extend through the stack of cards;

placing a molten metal conductor into said continuous openings; and solidifying said molten metal.

References Cited by the Examiner

UNITED STATES PATENTS 2,889,532 6/1959 Slack.

LEWIS H. MYERS, *Primary Examiner.*

DARRELL L. CLAY, *Examiner.*